US012596612B1

(12) United States Patent
Mohan et al.

(10) Patent No.: US 12,596,612 B1
(45) Date of Patent: Apr. 7, 2026

(54) VIRTUAL METADATA STORAGE WITH DECODE-ALIAS MITIGATION

(71) Applicant: Astera Labs, Inc., Santa Clara, CA (US)

(72) Inventors: Jitendra Mohan, Santa Clara, CA (US); Justina Provine, Fremont, CA (US); Anh T. Tran, Elk Grove, CA (US); Ken (Keqin) Han, Fremont, CA (US); Enrique Musoll, San Jose, CA (US)

(73) Assignee: Astera Labs, Inc., San Jose, CA (US)

( * ) Notice: Subject to any disclaimer, the term of this patent is extended or adjusted under 35 U.S.C. 154(b) by 58 days.

(21) Appl. No.: 18/800,929

(22) Filed: Aug. 12, 2024

Related U.S. Application Data

(63) Continuation-in-part of application No. 18/385,021, filed on Oct. 30, 2023, now Pat. No. 12,277,350.

(51) Int. Cl.
G06F 11/10 (2006.01)

(52) U.S. Cl.
CPC ...... G06F 11/1068 (2013.01); G06F 11/1004 (2013.01)

(58) Field of Classification Search
None
See application file for complete search history.

(56) References Cited

U.S. PATENT DOCUMENTS

| | | |
|---|---|---|
| 4,507,779 A | 3/1985 | Barner, Jr. et al. |
| 4,541,091 A | 9/1985 | Nishida et al. |
| 4,541,092 A | 9/1985 | Sako et al. |
| 4,607,367 A | 8/1986 | Ive et al. |
| 5,010,554 A | 4/1991 | Bechtel et al. |
| 5,051,998 A | 9/1991 | Murai et al. |
| 5,430,739 A | 7/1995 | Wei et al. |

(Continued)

OTHER PUBLICATIONS

Patel et al., "Bit-Exact ECC Recovery (BEER): Determining DRAM On-Die ECC Functions by Exploiting DRAM Data Retention Characteristics," 2020 53rd Annual IEEE/ACM International Symposium on Microarchitecture (MICRO), Athens, Greece, 2020, pp. 282-297. (Year: 2020).

(Continued)

*Primary Examiner* — Daniel F. McMahon
(74) *Attorney, Agent, or Firm* — Charles Shemwell

(57) ABSTRACT

An integrated circuit component receives a data block and corresponding error correction code from one or more external memory components in a memory read operation and then executes error detection/correction operations with respect to a plurality of input data volumes to generate a corresponding plurality of error syndrome values, the input data volumes each including the data block and corresponding error correction code together with a respective, different metadata bit patterns such that each of the input data volumes is identical to the others of the input data volumes except for the different metadata bit patterns. The integrated circuit component generates error qualification information by comparing error location information within the plurality of syndrome values with predetermined error location information and selects one of the metadata bit patterns to be an output metadata value based on the error syndrome values and the error qualification information.

21 Claims, 15 Drawing Sheets

(56)                References Cited

U.S. PATENT DOCUMENTS

| | | | |
|---|---|---|---|
| 5,483,236 | A | 1/1996 | Bi |
| 5,926,490 | A | 7/1999 | Reed et al. |
| 5,961,658 | A | 10/1999 | Reed et al. |
| 6,009,549 | A | 12/1999 | Bliss et al. |
| 6,332,206 | B1 | 12/2001 | Nakatsuji et al. |
| 8,127,209 | B1 * | 2/2012 | Zhang .................. H03M 13/036 |
| | | | 714/780 |
| 8,694,862 | B2 | 4/2014 | Sazeides et al. |
| 9,569,308 | B1 | 2/2017 | Ware et al. |
| 10,439,648 | B1 * | 10/2019 | Khayat ............. H03M 13/2927 |
| 10,797,728 | B1 | 10/2020 | Varnica |
| 12,061,793 | B1 * | 8/2024 | Musoll .............. H03M 13/2906 |
| 2001/0036236 | A1 | 11/2001 | Kobayashi et al. |
| 2002/0199153 | A1 | 12/2002 | Fall |
| 2003/0031236 | A1 | 2/2003 | Dahlman et al. |
| 2010/0299575 | A1 | 11/2010 | Roth et al. |
| 2012/0121084 | A1 | 5/2012 | Tomlinson et al. |
| 2012/0284589 | A1 | 11/2012 | Kim et al. |
| 2013/0246889 | A1 * | 9/2013 | Kumar ................... G11C 29/42 |
| | | | 714/763 |
| 2013/0318423 | A1 * | 11/2013 | Jagmohan ........... G06F 11/1008 |
| | | | 714/E11.032 |
| 2014/0047265 | A1 | 2/2014 | Das et al. |
| 2014/0068390 | A1 | 3/2014 | Schmidberger et al. |
| 2014/0136931 | A1 | 5/2014 | Nakamura et al. |
| 2015/0256197 | A1 | 9/2015 | Kim et al. |
| 2016/0006459 | A1 | 1/2016 | Hanham et al. |
| 2016/0092307 | A1 | 3/2016 | Bonen et al. |
| 2016/0336971 | A1 | 11/2016 | Fong et al. |
| 2016/0365876 | A1 * | 12/2016 | Greenspan .......... H03M 13/451 |
| 2017/0063394 | A1 | 3/2017 | Halbert et al. |
| 2017/0093528 | A1 | 3/2017 | Oveis Gharan et al. |
| 2017/0255394 | A1 | 9/2017 | Suh et al. |
| 2018/0060160 | A1 | 3/2018 | Fang et al. |
| 2020/0097359 | A1 | 3/2020 | O'Connor et al. |
| 2020/0401475 | A1 | 12/2020 | Lu |
| 2021/0208967 | A1 * | 7/2021 | Cha ........................ H03M 13/13 |
| 2022/0013187 | A1 * | 1/2022 | Santhanam ....... H03M 13/1545 |
| 2022/0091936 | A1 * | 3/2022 | La Fetra ............. G06F 11/1076 |
| 2024/0380415 | A1 * | 11/2024 | Dakshinamoorthy ....................... |
| | | | H03M 13/09 |

OTHER PUBLICATIONS

Rakus et al., "Five Times Extended Reed-Solomon Codes Applicable in Memory Storage Systems," IEEE Letters of the Computer Society, vol. 2, No. 2, pp. 9-11. (Year: 2019).

Intel Corporation, "Intel Xeon Processor E5-1600/2400/2600/4600 v3 Product Families Datasheet—vol. 2: Registers," Jun. 2015, 414 pages.

Molka et al., "Cache Coherence Protocol and Memory Performance of the Intel Haswell—EP Architecture," IEEE 2015, 10 pages.

* cited by examiner

FIG. 3

| # Bad Symbols | Syndrome Status | Syndrome Comparator Action |
|---|---|---|
| 0 | one syndrome reports 0 bad symbols<br>other syndromes each report 1 bad symbol | output syndrome reporting fewest bad symbols and encode metadata accordingly (data good, metadata good) |
| 1 to (n-k)/2 | one syndrome reports 1 to (n-k)/2 bad symbols<br>other syndromes each report 2 to ((n-k)/2)+1 bad symbols | output syndrome reporting fewest bad symbols and encode metadata accordingly (data good, metadata good) |
| 1+(n-k)/2 to n-k-1 | one syndrome reports 1+(n-k)/2 bad to n-k-1 bad symbols<br>other syndromes each report 2+(n-k)/2 to n-k bad symbols | output syndrome reporting fewest bad symbols and encode metadata accordingly (data bad, metadata good) |
| n-k | one syndrome reports n-k bad symbols<br>other syndromes each report bogus value | output syndrome reporting n-k bad symbols and encode metadata according to that syndrome (data bad, metadata good) |
| >n-k | all syndromes report bogus values | output bogus-valued syndrome with default/don't-care metadata-encoding (data bad, metadata bad) |

FIG. 2

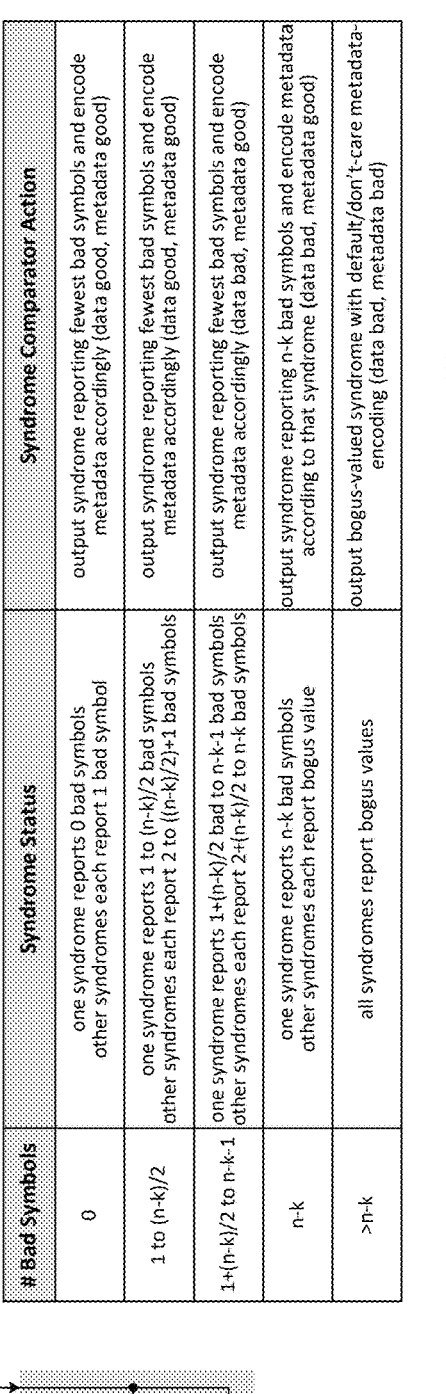

FIG. 6

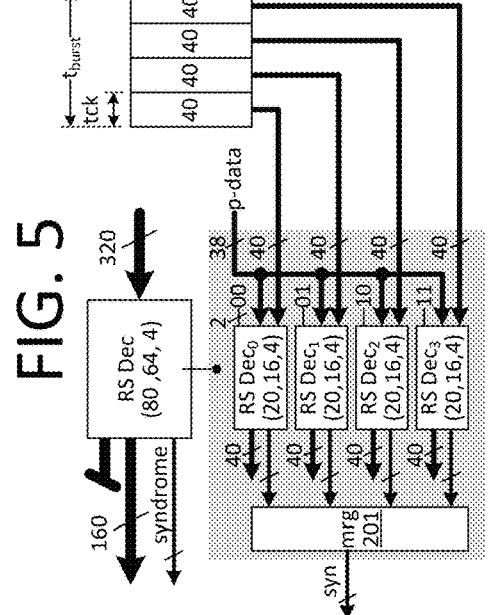

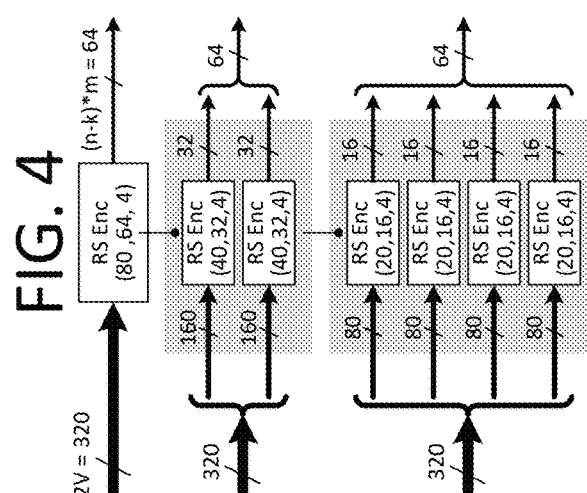

FIG. 8

SDC avoidance (RS aliasing detection)

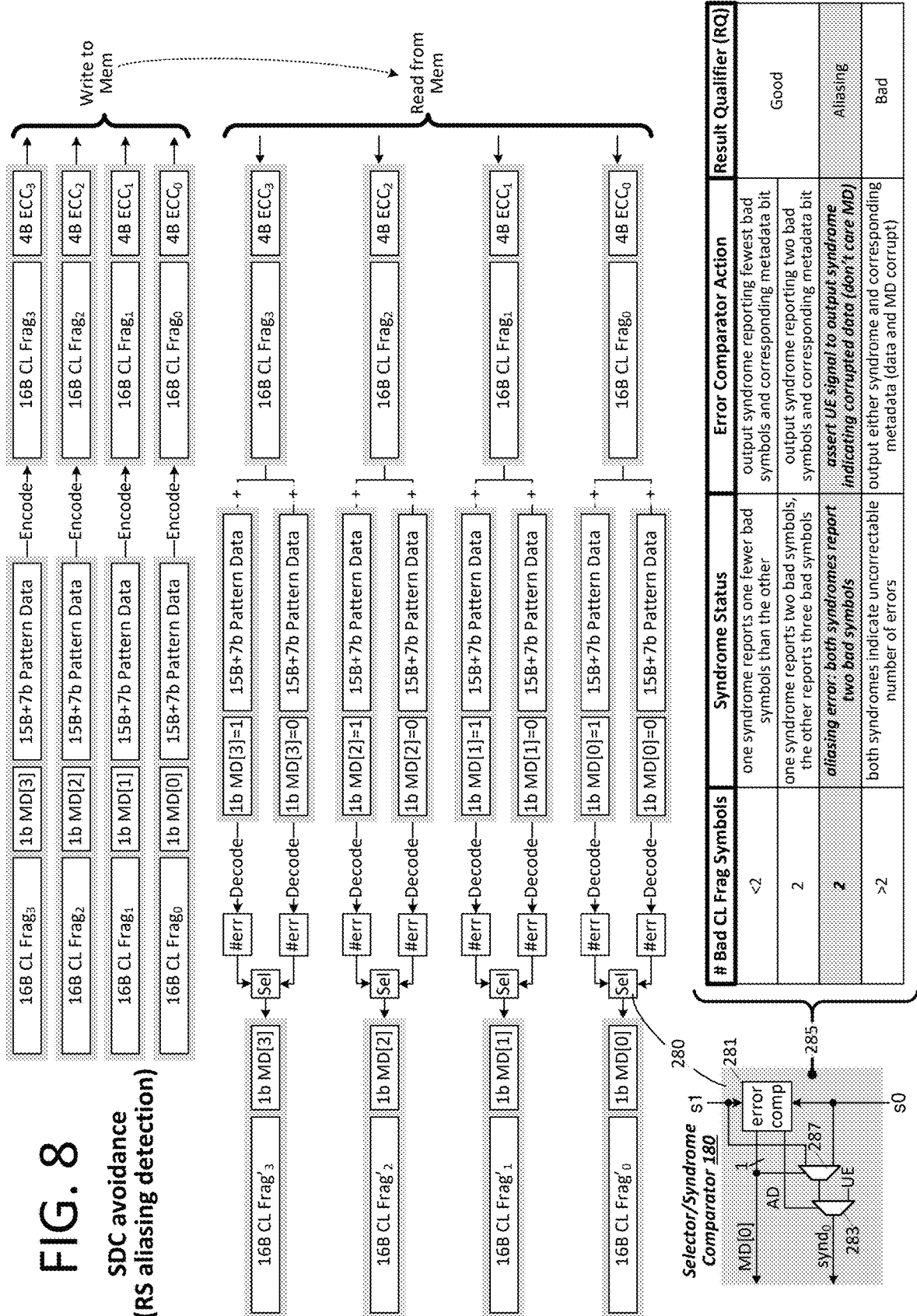

| # Bad CL Frag Symbols | Syndrome Status | Error Comparator Action | Result Qualifier (RQ) |
|---|---|---|---|
| <2 | one syndrome reports one fewer bad symbols than the other | output syndrome reporting fewest bad symbols and corresponding metadata bit | Good |
| 2 | one syndrome reports two bad symbols, the other reports three bad symbols | output syndrome reporting two bad symbols and corresponding metadata bit | Good |
| 2 | *aliasing error: both syndromes report two bad symbols* | *assert UE signal to output syndrome indicating corrupted data (don't care MD)* | *Aliasing* |
| >2 | both syndromes indicate uncorrectable number of errors | output either syndrome and corresponding metadata (data and MD corrupt) | Bad |

RS aliasing mitigation via redundant metadata encode/decode

FIG. 9B

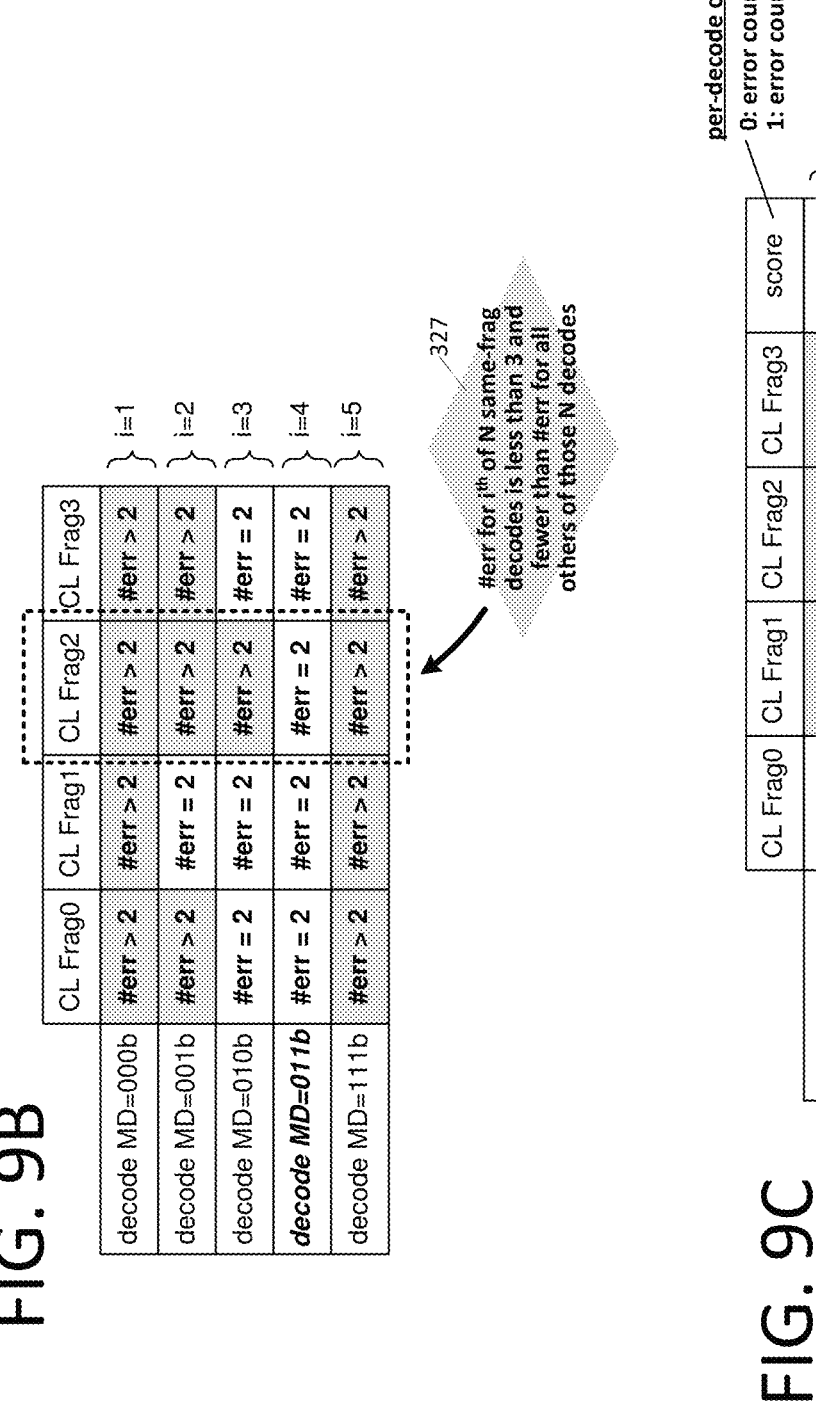

| | CL Frag0 | CL Frag1 | CL Frag2 | CL Frag3 | |
|---|---|---|---|---|---|
| decode MD=000b | #err > 2 | #err > 2 | #err > 2 | #err > 2 | i=1 |
| decode MD=001b | #err > 2 | #err = 2 | #err > 2 | #err > 2 | i=2 |
| decode MD=010b | #err = 2 | #err = 2 | #err > 2 | #err = 2 | i=3 |
| *decode MD=011b* | #err = 2 | #err = 2 | #err = 2 | #err = 2 | i=4 |
| decode MD=111b | #err > 2 | #err > 2 | #err > 2 | #err > 2 | i=5 |

327 err for i$^{th}$ of N same-frag decodes is less than 3 and fewer than #err for all others of those N decodes

FIG. 9C per-decode contribution
0: error count ≤ 2
1: error count > 2

| | CL Frag0 | CL Frag1 | CL Frag2 | CL Frag3 | score |
|---|---|---|---|---|---|
| decode MD=000b | #err = 2 | #err > 2 | #err > 2 | #err > 2 | 3 |
| decode MD=001b | #err > 2 | #err = 2 | #err > 2 | #err > 2 | 3 |
| *decode MD=010b* | #err = 2 | #err = 2 | #err = 2 | #err = 2 | 0 |
| decode MD=011b | #err > 2 | #err > 2 | #err > 2 | #err = 2 | 3 |
| decode MD=111b | #err > 2 | #err = 2 | #err = 2 | #err > 2 | 2 | i=1, i=2, i=3, i=4, i=5

*voting* err for i$^{th}$ one and only i$^{th}$ one of N same-frag decodes is less than 3 for all 4 fragment decodes

331

FIG. 12　Link Fault – Systemic Symbol Error

FIG. 15
Autonomous Link Failure Detect Auto-Enable Alias Disqualify
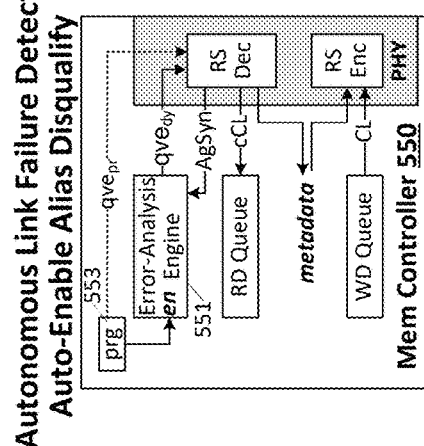
FIG. 16
Programmable RS symbol size
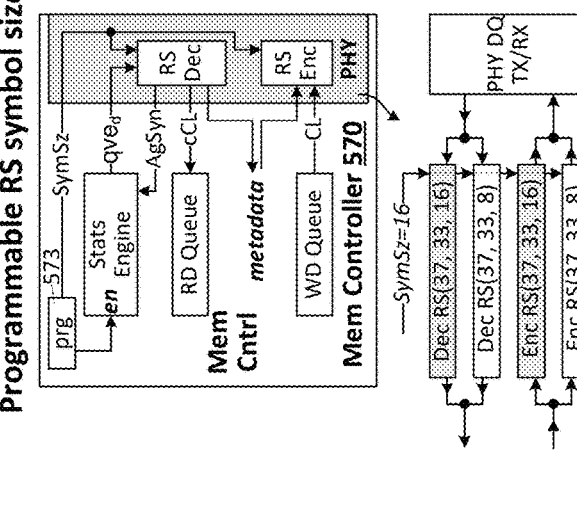
FIG. 14
Identify/Disqualify Aliased Decode Results

FIG. 17

FIG. 18   Link Fault – Systemic Symbol Error

| valid MD states (vmds) | poison bit y/n (pois) | used bits per MD symbol | e4 | cMD₄ | e3 | cMD₃ | e2 | cMD₂ | e1 | cMD₁ | e0 | cMD₀ |
|---|---|---|---|---|---|---|---|---|---|---|---|---|
| 4 | yes | 3 | 1 | 111 | 1 | 011 | 1 | 010 | 1 | 001 | 1 | 000 |
| 4 | no | 2 | 0 | xxx | 1 | 011 | 1 | 010 | 1 | 001 | 1 | 000 |
| 2 | yes | 2 | 0 | xxx | 0 | xxx | 1 | 111 | 1 | 001 | 1 | 000 |
| 2 | no | 1 | 0 | xxx | 0 | xxx | 1 | xxx | 1 | 001 | 1 | 000 | poison states

VIRTUAL METADATA STORAGE WITH DECODE-ALIAS MITIGATION

CROSS REFERENCE TO RELATED APPLICATIONS

This application is a continuation-in-part of and hereby incorporates by reference U.S. application Ser. No. 18/385, 021 filed Oct. 30, 2023.

DRAWINGS

The various embodiments disclosed herein are illustrated by way of example, and not by way of limitation, in the figures of the accompanying drawings and in which like reference numerals refer to similar elements and in which:

FIG. 2 illustrates an exemplary syndrome comparator embodiment that may be used to implement the syndrome comparator shown in FIG. 1;

Figure 7:
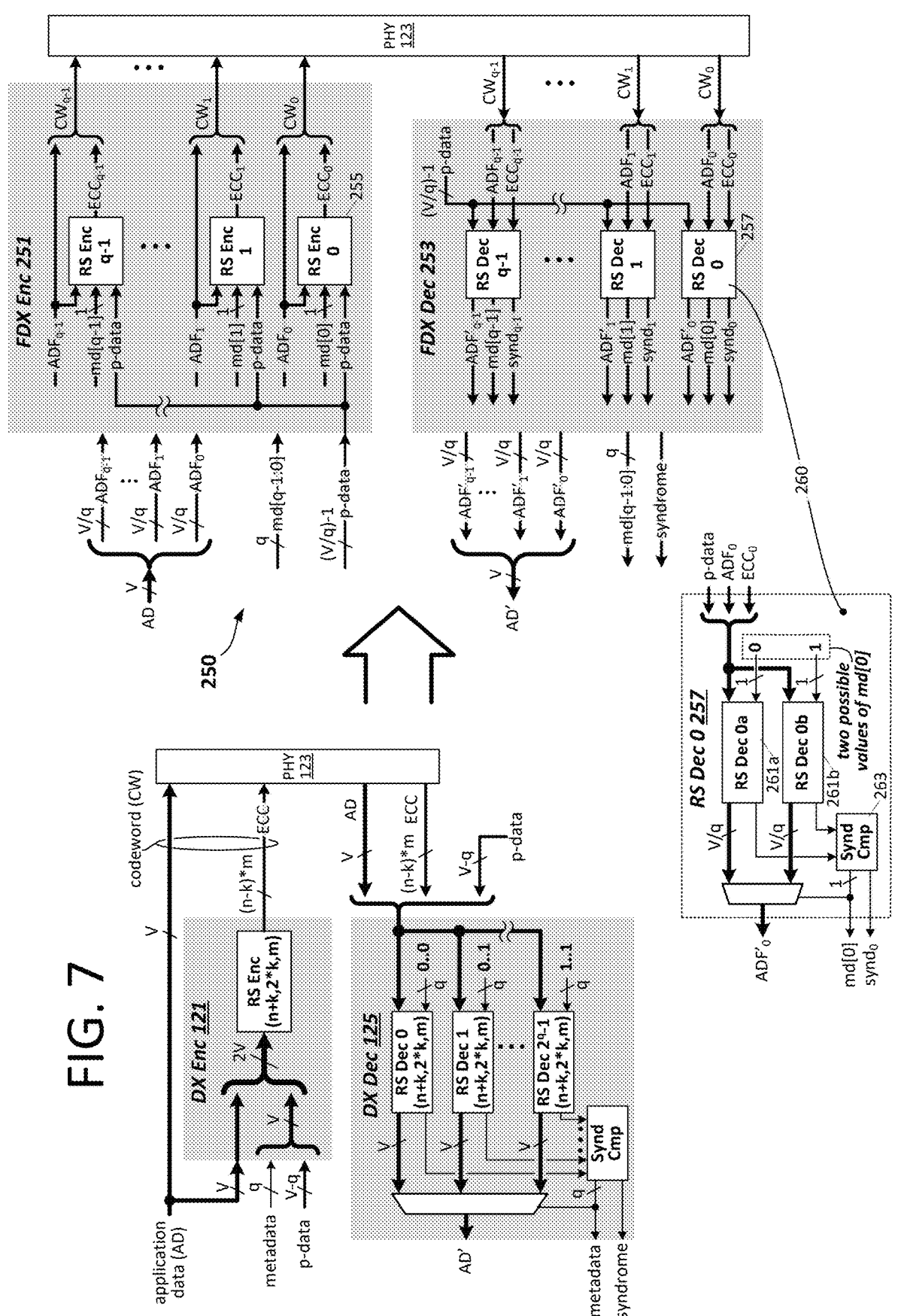
Figure 9A:
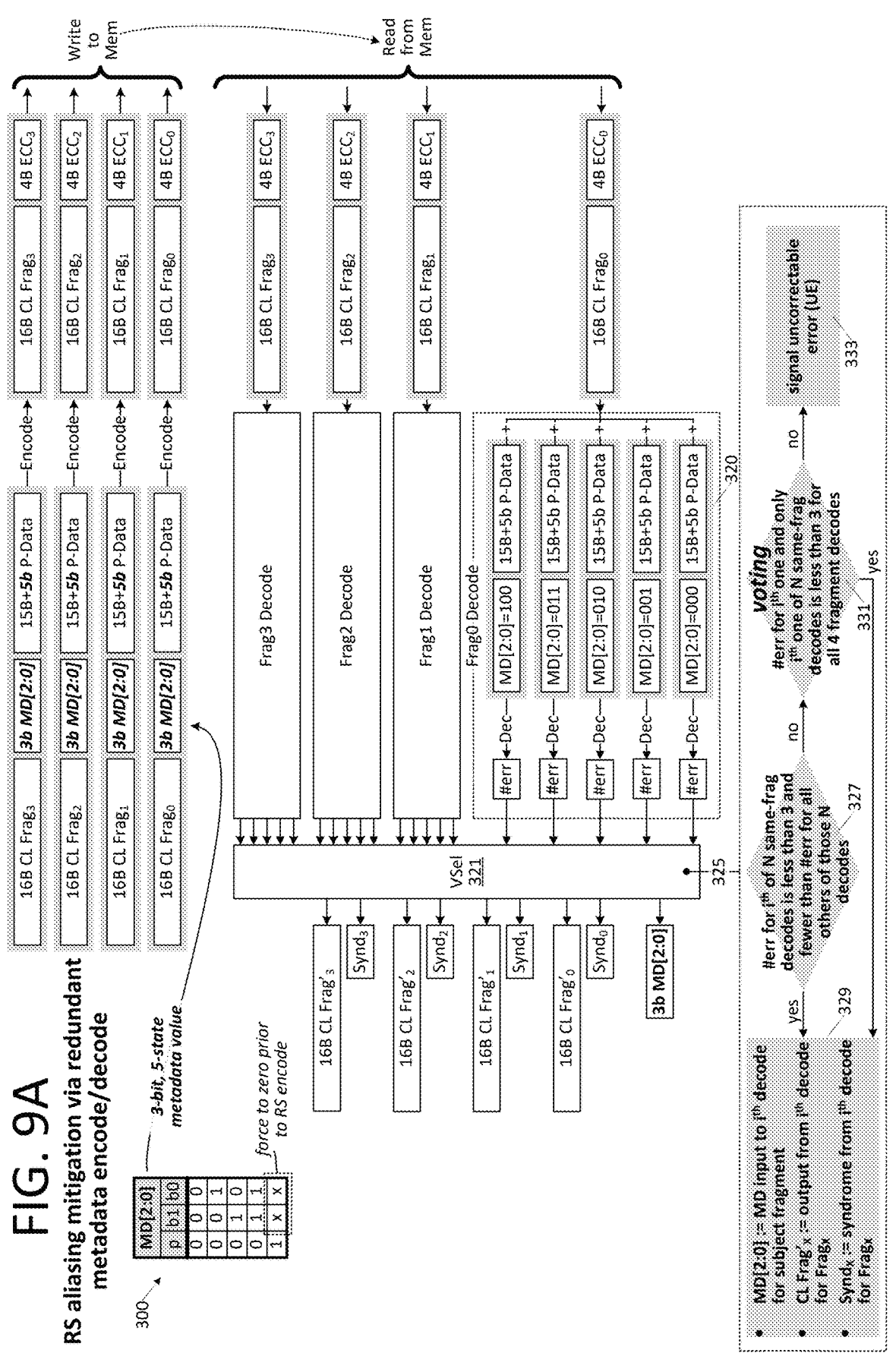
Figure 10:
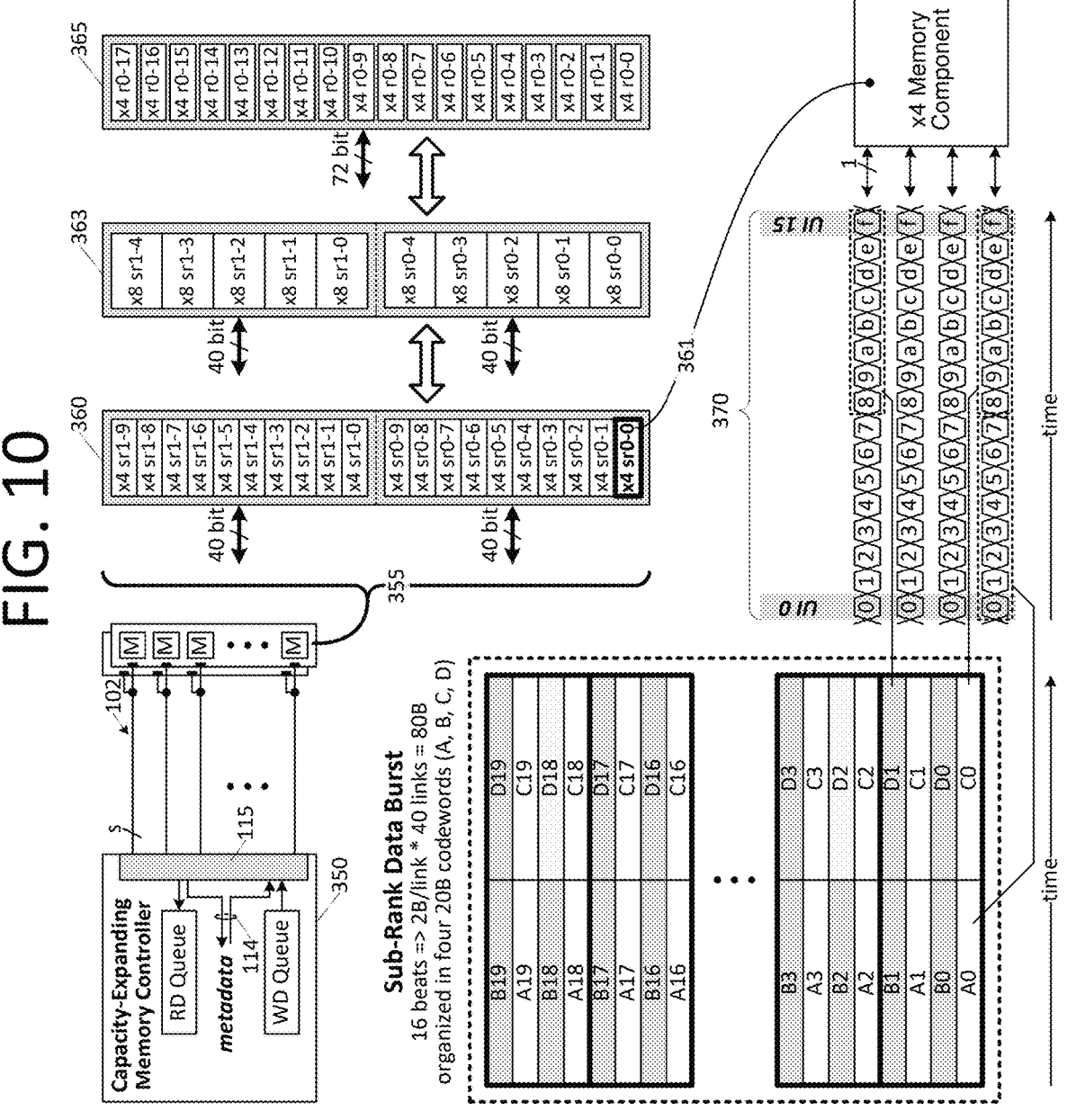
Figure 11:
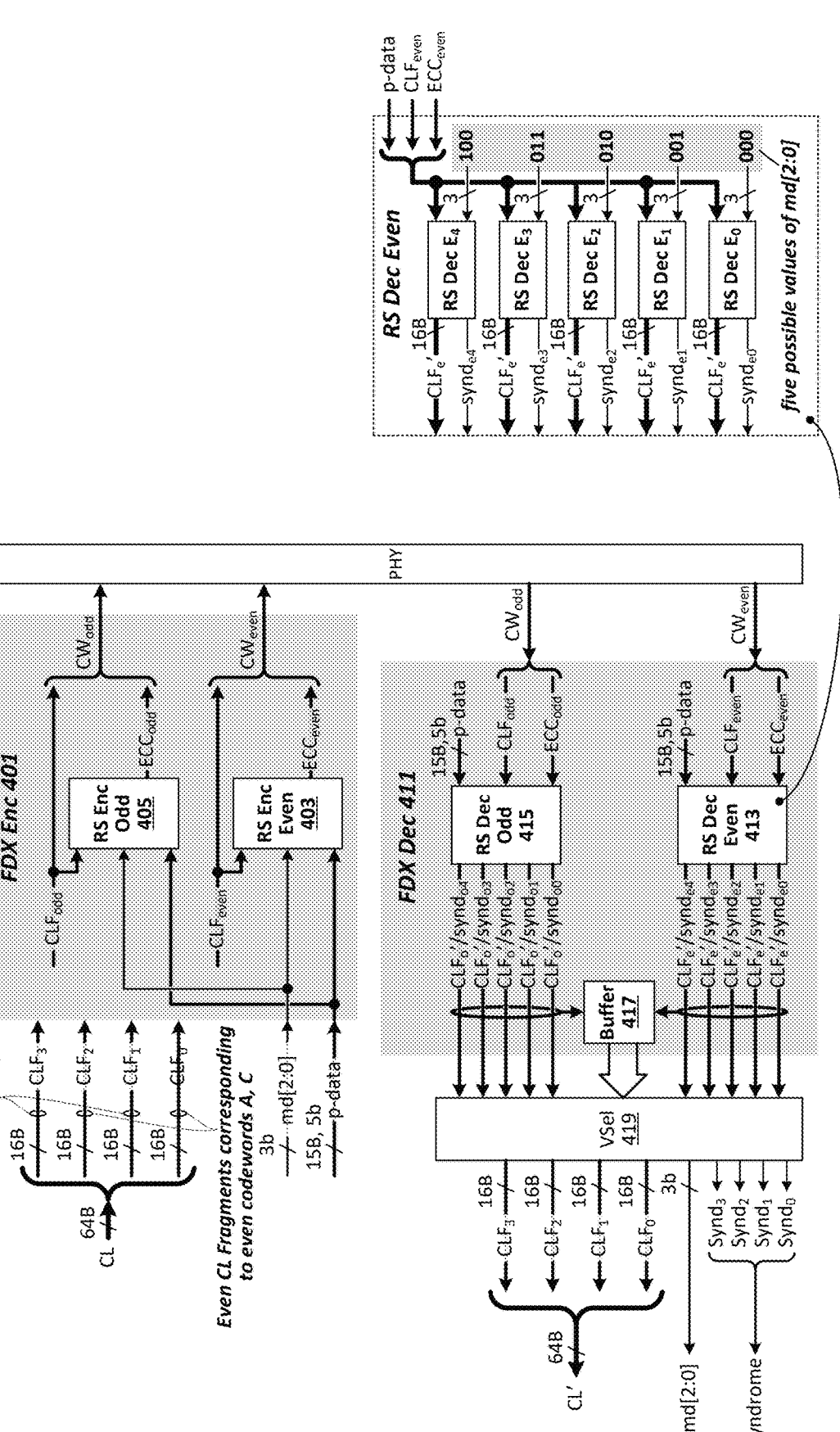
Figure 12:
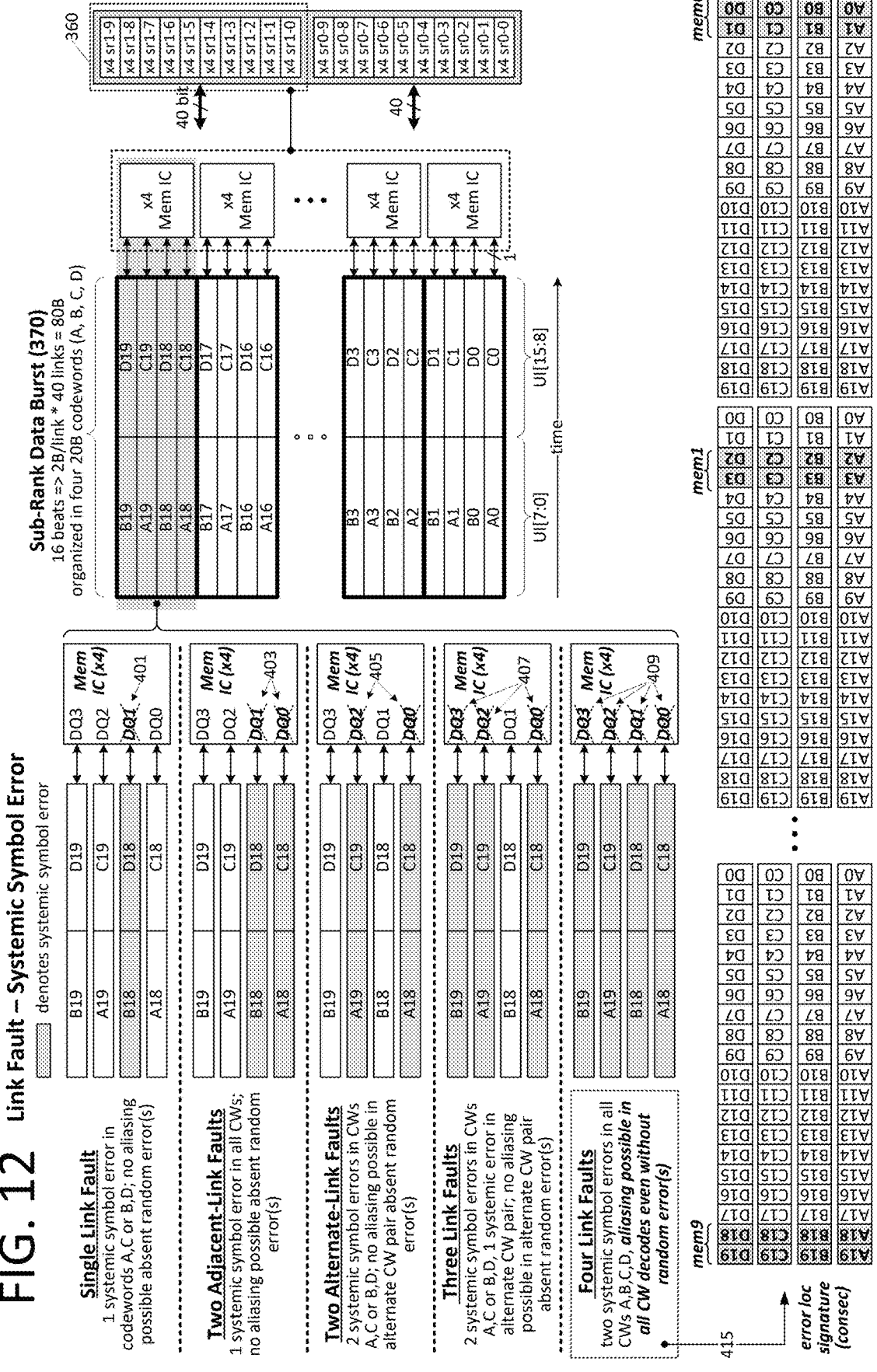
Figure 13:
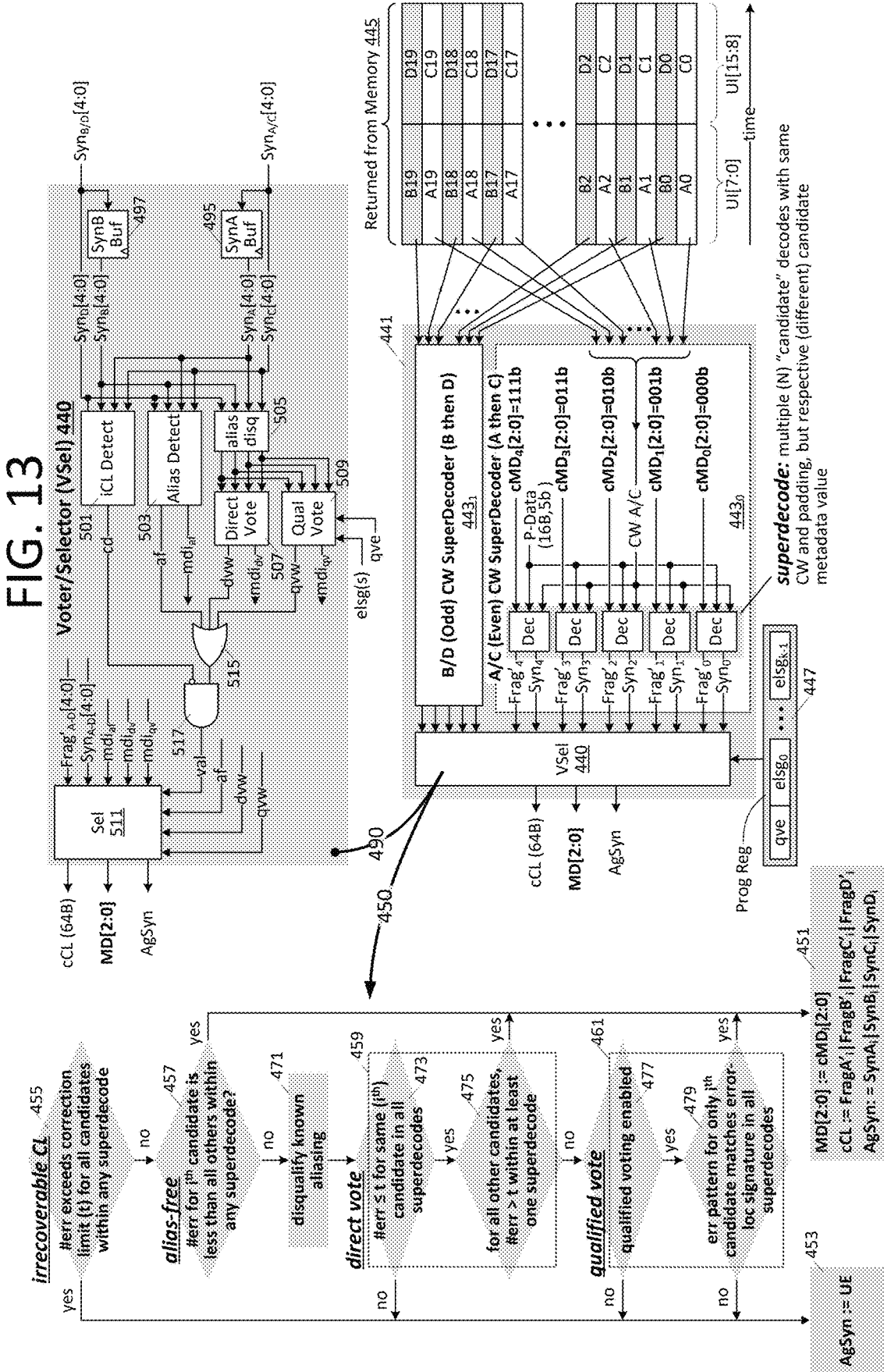
Figure 19:
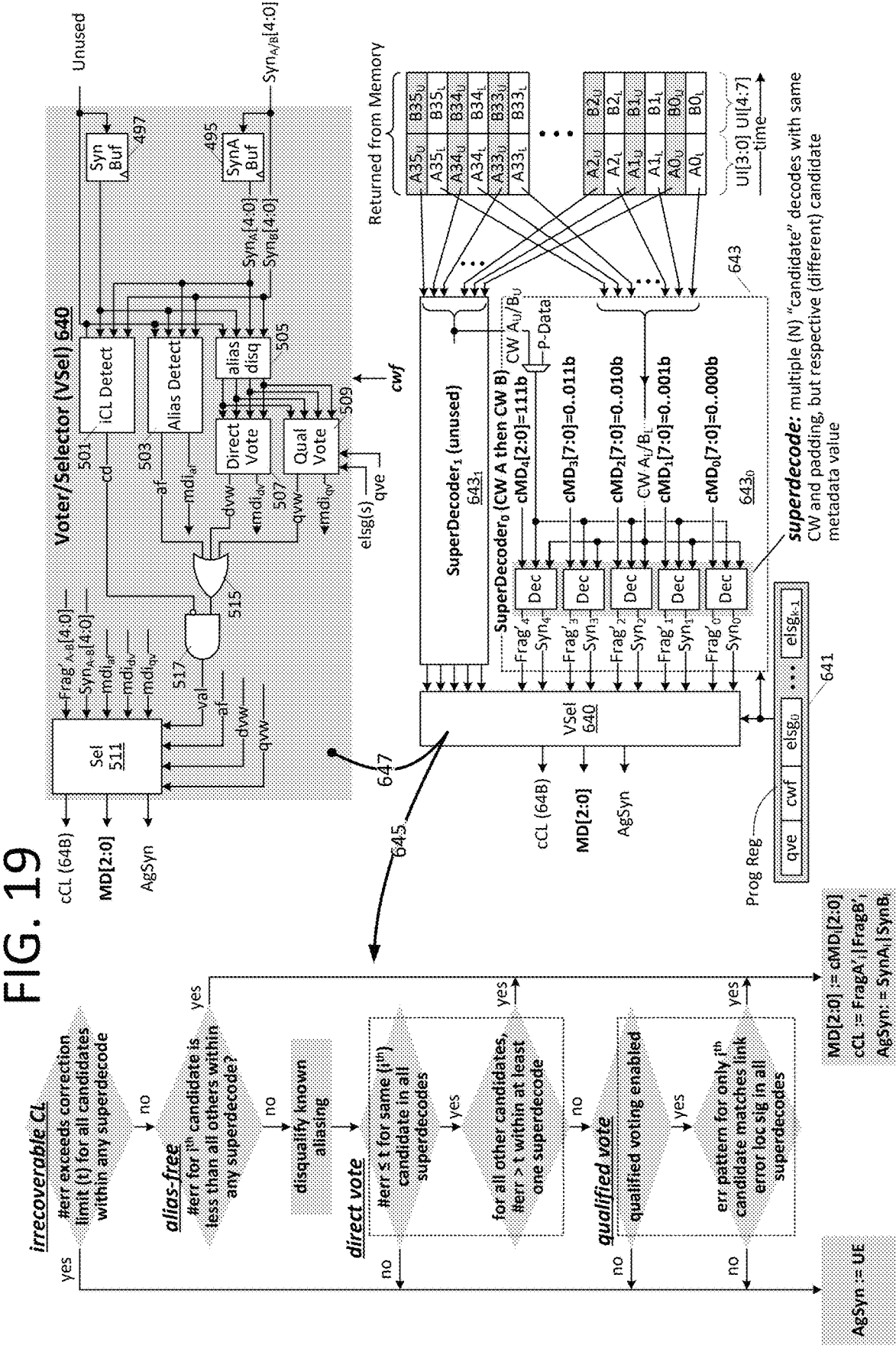
Figure 20:
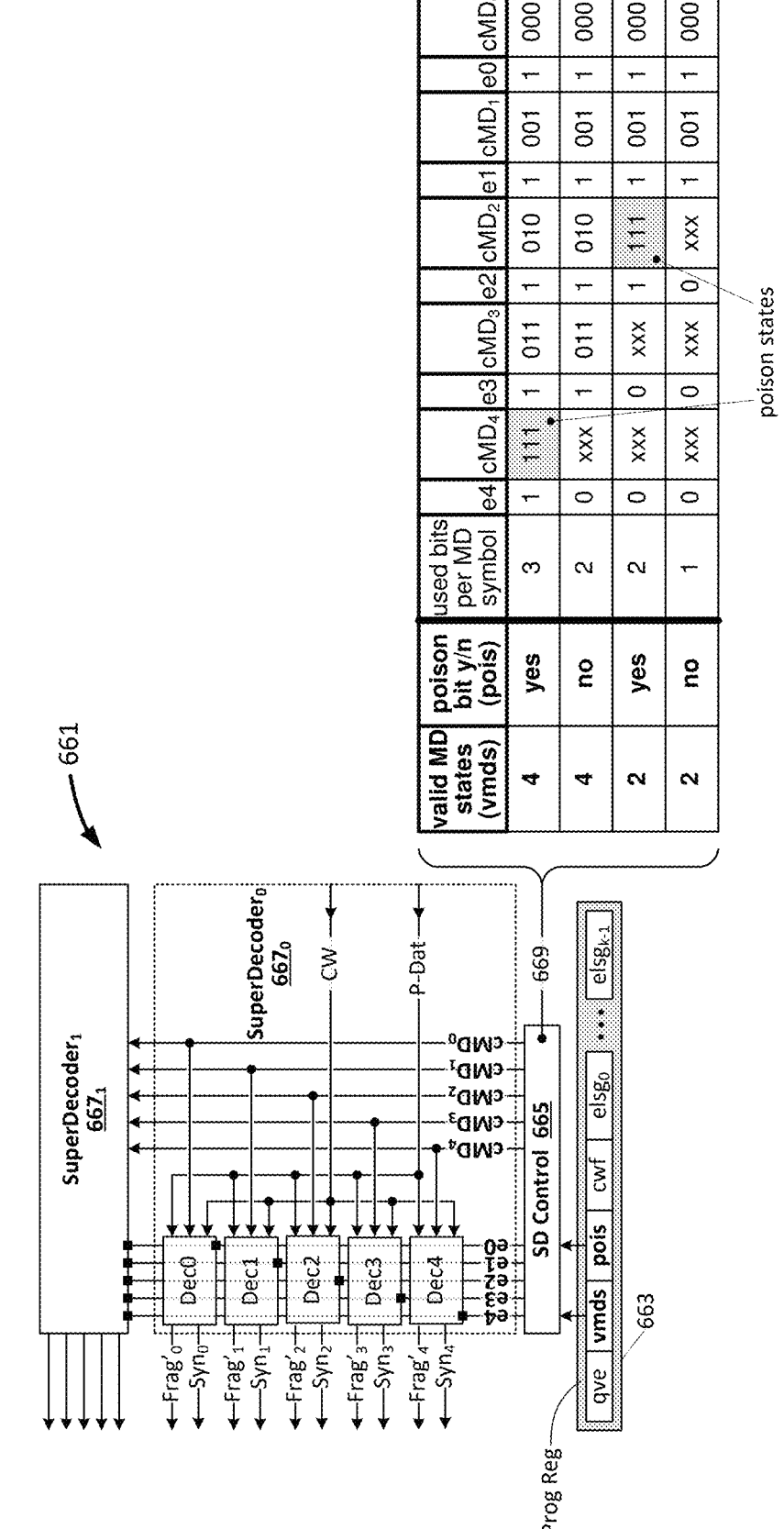

FIG. 3 presents an exemplary listing/tabulation of actions implemented by the FIG. 2 syndrome comparator for various syndrome status conditions and corresponding bad-symbol counts in the case where metadata size is less than or equal to Reed-Solomon (RS) symbol size;

FIG. 4 illustrates an exemplary RS encoder implemented by two or more component RS encoders;

FIG. 5 illustrates an exemplary RS decoder likewise be implemented by two or more component RS decoders; and FIG. 6 illustrates exemplary application of a single RS decoder to iteratively execute multiple RS decode operations with respect to the same application data block;

FIG. 7 illustrates an embodiment of a fragmenting data-expanding RS encoder/decoder set that implements data-expanded RS encoding and decoding operations with respect to multiple fragments of an application data block;

FIG. 8 presents a conceptual encoding/decoding operation implemented within the FIG. 7 hardware set with respect to a 64-byte (64B) cache line and 4-bit (4b) metadata value;

FIG. 9A illustrates an alternative RS metadata encoding/ recovery approach in which a multi-bit metadata value is redundantly applied in cache-line-fragment RS encoding and decoding operations to exponentially lower the likelihood of error-count aliasing;

FIGS. 9B and 9C illustrate RS decode examples that yield affirmative determinations within respective decision blocks shown in the operational flow of FIG. 9A;

FIG. 10 illustrates an embodiment of an aliasing-mitigating, capacity-expanding memory control component and its interconnection to DIMMs of various form-factors and configurations;

FIG. 11 illustrates an example of a data-expanding RS-encoding/decoding architecture that iteratively encodes cache line fragments and metadata into codeword pairs in a memory write transaction and then, during cache line read back, iteratively decodes those cache line fragments to recover the original metadata and generate error-corrected cache line fragments;

FIG. 12 illustrates systemic "link fault" errors that may occur and be detected within the memory system of FIG. 10;

FIG. 13 illustrates an embodiment of voter/selector circuitry that leverages systemic-error location signatures to disqualify aliasing events and thus enable metadata and application data recovery under scenarios that may otherwise yield uncorrectable errors;

FIG. 14 illustrates additional detail with respect to the known-aliasing disqualifier, direct voting circuitry, and qualified voting circuitry shown in FIG. 13;

FIG. 15 illustrates an embodiment of a memory control component having error-analysis circuitry to selectively enable qualified voting within associated decoding circuitry;

FIG. 16 illustrates an embodiment of a memory control component having selectable-symbol-size Reed-Solomon encoders and decoders;

Figure 17:
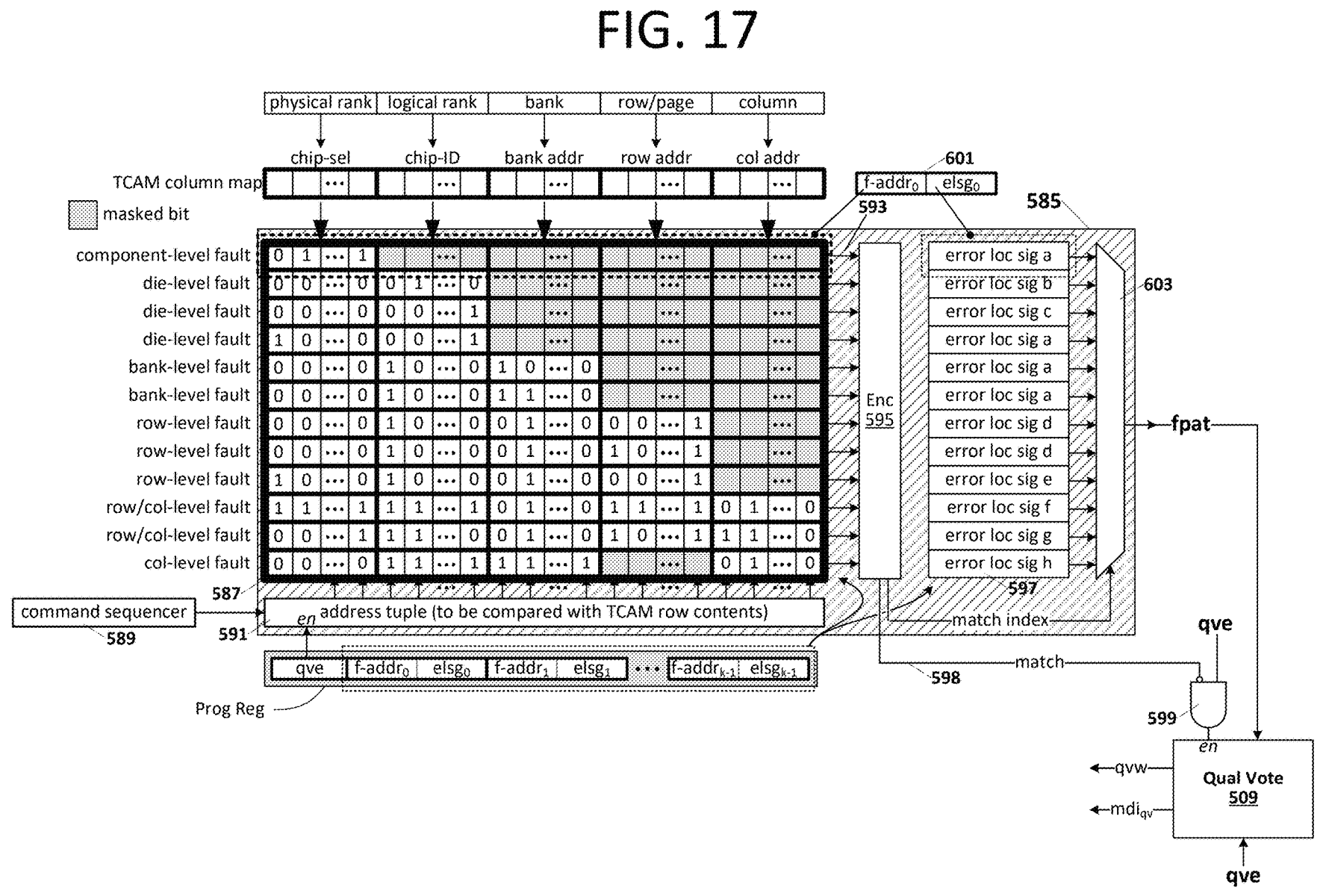

FIG. 17 illustrates exemplary address-compare circuitry that may be deployed within the error-analysis engine shown in FIGS. 15 and 16;

Figure 18:
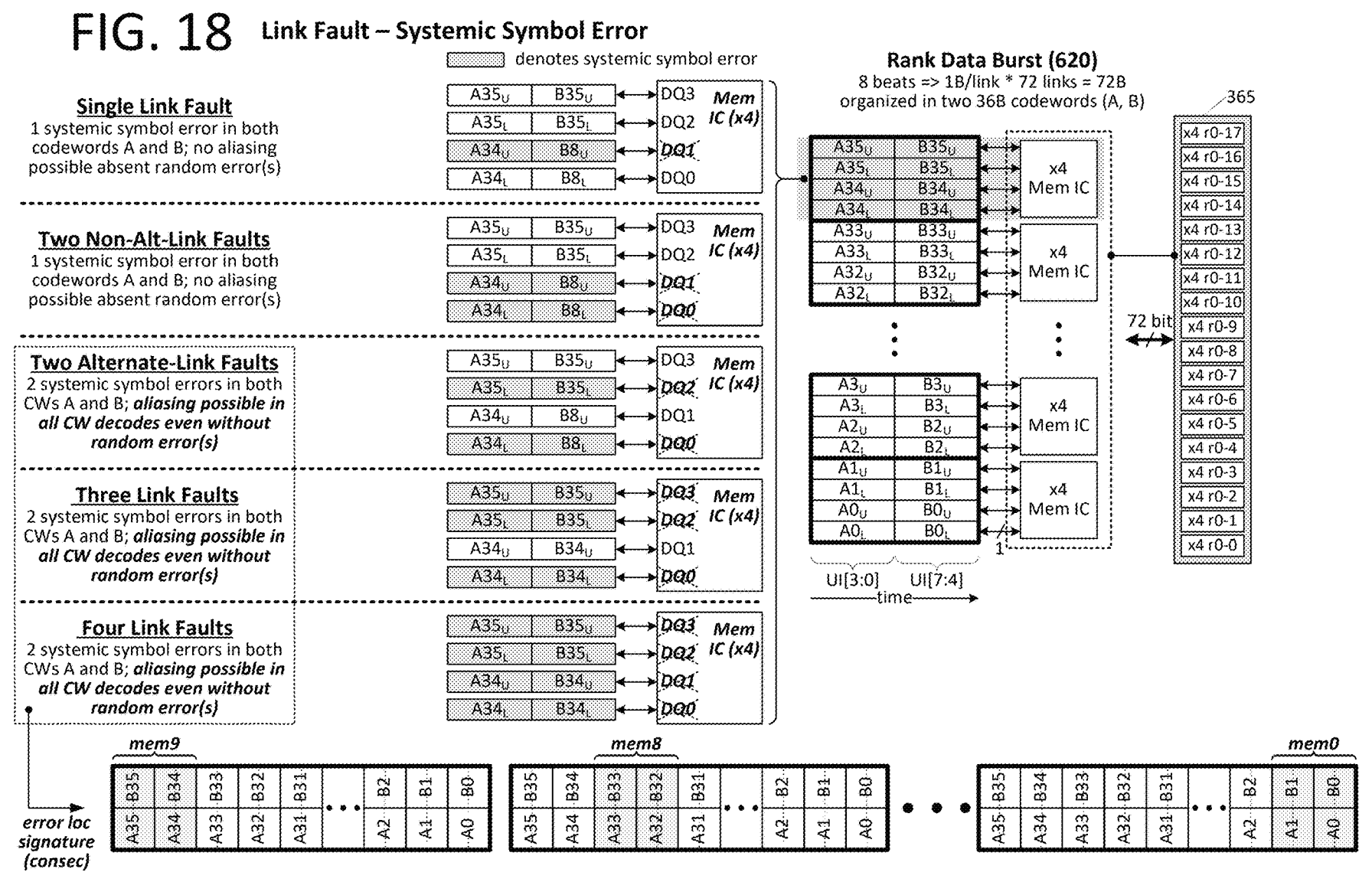

FIG. 18 illustrates an exemplary link-fault patterns for a dual-inline memory module that transmits/receives 72-byte codewords constituted by a 64-byte cache line and 8-byte error-correction code in two successive 36-byte codewords;

FIG. 19 illustrates an embodiment of a voter/selector circuit similar to that shown in FIG. 13 but having additional circuitry to support programmably selected codeword size and quantity; and FIG. 20 illustrates a Reed-Solomon decode engine that supports programmable specification of a variable number of metadata states and/or poison bit inclusion.

DETAILED DESCRIPTION

In various embodiments herein a memory control component encodes over-capacity data into an error correction code (ECC) generated for and stored in association with an application data block, inferentially recovering the over-capacity data during application data block read-back by comparing error syndromes generated in detection/correction operations for respective combinations of each possible value of the over-capacity data and the read-back application data block. In a number of embodiments, application data blocks and corresponding data-encoded ECCs are stored within and read back from integrated-circuit memory devices disposed on a dual inline memory module (DIMM), with the ECC-encoded over-capacity data storage increasing the effective data storage capacity of the DIMM in accordance with the relative sizes (volumes, bit-counts) of the application data block and over-capacity data. In applications where the over-capacity data is generated by (and returned upon read-back to) one or more components or entities other than the application data requestor—as in the case of metadata storage required by various high-performance interconnect standards—ECC-encoded over-capacity storage of the metadata obviates both compromised application data storage capacity (e.g., where metadata storage would otherwise consume some portion of the application data storage capacity) and auxiliary hardware storage expense/overhead (i.e., no need for the costly and area-consuming additional memory that plagues conventional metadata storage solutions).

Figure 1:
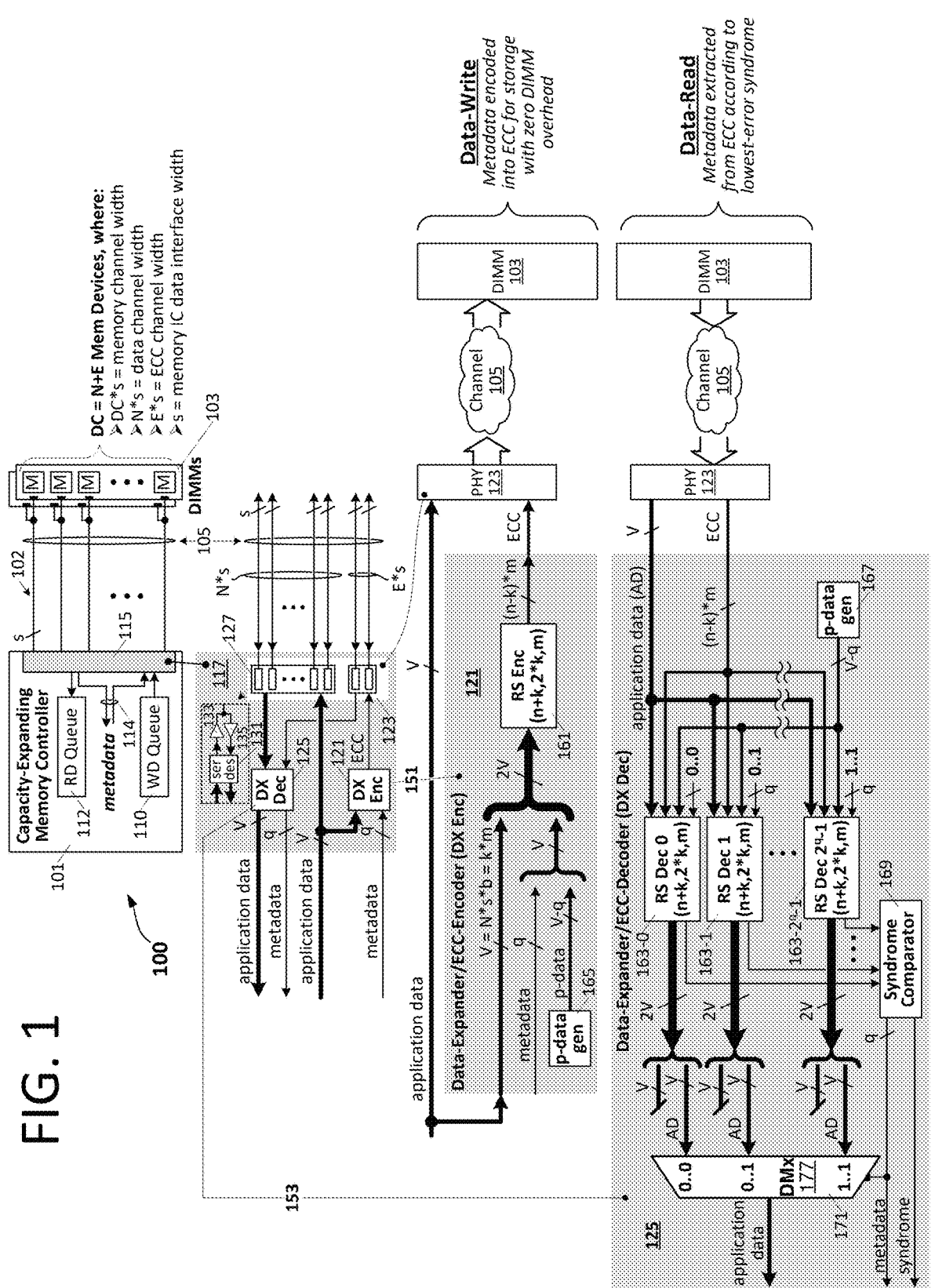
FIG. 1 illustrates an embodiment of a memory system having a capacity-expanding memory control component coupled to one or more dual inline memory modules (DIMMs)

FIG. 1 illustrates an embodiment of a memory system 100 having a capacity-expanding memory control component 101 coupled via data links 102 to one or more DIMMs 103. In the depicted example, memory control component 101 ("controller") includes write and read data queues (110, 112) together with connections (114) to a "metadata" source/ destination (which could be the read and write data queues themselves rather than an alternative entity) and an error detecting/correcting data-signaling interface 115, the latter to generate for each outgoing write data block (a volume of "application" data to be stored/written within constituent memory devices of a selected DIMM 103 in a memory write transaction) an error correction code to be stored in DIMM 103 with the write data block. During data read-back, both the application data block (the write data block during the memory-write transaction and now, in a subsequent memory read transaction, a read data block) and the corresponding error correction code are output from DIMM 103 to controller 101, the latter (ECC) being applied within data signaling interface 115 to detect, and if necessary/possible, correct corrupted (bad) symbols within the retrieved application data block.

Referring to detail view 117 of signaling interface 115, the metadata and corresponding application data block are applied, during a data write transaction, to data-expander/ECC encoding circuitry 121 which responsively generates a data-dependent ECC—an error correction code that reflects both the application data block and the metadata—outputting the application data block and ECC to a selected DIMM via physical signaling interface 123 (PHY). During subsequent data read back (i.e., in a memory read transaction), the retrieved-from-memory application data block and ECC (arriving via PHY 123) are applied, in combination with each possible metadata value (and thus $2^q$ different values or bit patterns where the metadata is constituted by 'q' bits), to data-expander/ECC decoding circuitry 125 to yield 29 error syndromes—a respective syndrome for each different possible metadata value. Assuming for sake of explanation that there are no errors in the read-back application data block or ECC, then whichever of the $2^q$ metadata values supplied to ECC decoder 125 matches the metadata value used to encode the ECC will yield a no-error syndrome (i.e., syndrome value indicating that no errors were detected), distinguishing that specific metadata value from all others (as the syndromes generated using the remaining $2^q - 1$ metadata values will all indicate one error corresponding to the incorrect metadata value) and thus enabling the originally written metadata value to be recovered (or inferred, extracted) as part of the ECC decoding operation. As a more specific example, where ECC encoding/decoding is implemented as part of a block-based error correction/detection scheme that enables detection of errors with multi-bit symbol granularity (e.g., 4-bit symbol, 8-bit symbol, etc.), the ECC decode operation applying the correct (original-matching) metadata value will produce one fewer symbol errors than all other (incorrect) metadata values—again, enabling recovery of the originally "written" metadata value. Because the size of the stored application data block and corresponding ECC exactly match the data block size and ECC size stored in a conventional memory system, the metadata is effectively stored (as part of the controller ECC encoding) and then retrieved (controller ECC decoding) with zero additional memory consumption within the DIMM. That is, the DIMM capacity available for application data storage (with such data including any type of user data, hardware-generated data, operating-system data, etc.) remains intact and uncompromised, and likewise with the storage space available for ECC-effectively expanding the capacity of the DIMM by a factor of (q+V)/V (where 'V' is the bit-size of the application data block) through additional ECC encoding and decoding.

In the FIG. 1 embodiment and a number of embodiments discussed below, data-expander/encoder 121 executes Reed-Solomon (RS) encoding (i.e., implements an RS encoder) to generate the metadata-dependent ECC during data write, and data-expander/decoder 125 executes $2^q$ RS decoding operations (within one or more RS decoders) during data read—one RS decoding operation for each of the $2^q$ possible metadata values—to both recover the ECC-encoded metadata bits and implement the primary ECC function (detecting/correcting symbol errors). To maintain a power-of-two message size (i.e., number (k) of m-bit symbols constituted by the data supplied to the RS encoder) despite the added metadata bits, the ECC encoders/decoders are enlarged/upgraded (relative to those needed for the application data block alone) to accommodate a message size twice that of the application data block (i.e., 2*V bits, where '*' denotes multiplication) and additional pattern data bits are combined with the metadata as necessary to produce the expanded, double-size data input. More specifically with regard to message size expansion, the V-bit application data block and q-bit metadata are supplemented by V−q (V minus q) bits of deterministic pattern data to form the expanded (2*V-bit) data input to the RS encoder during a data write transaction to a given memory address (yielding the ECC written with the application data block). Likewise, in a subsequent data read transaction directed to that same address, the retrieved application data block (V bits) is supplemented/expanded by the deterministic pattern data (i.e., regenerated within the controller as the pattern data has a predetermined or deterministically generable bit pattern) to form, together with each of the $2^q$ possible metadata values, $2^q$ messages each constituted by 2*V bits and differing only in the metadata value. While the FIG. 1 embodiment and other embodiments discussed below generally present a doubled expansion (i.e., from V to 2*V) of the message size (volume of data supplied to ECC encoder and then again to ECC decoder) relative to the application data block size (V), the message size may more generally be expanded by any practicable number of bits in all cases and, at least in an RS encoding/decoding scheme, by one or more or any practicable number of RS symbols (e.g., each RS symbol constituted by a predetermined number of bits) and thus to a size lesser than or greater than 2*V bits.

FIG. 1 illustrates the above-described data-expansion and encoder/decoder enlargement in detail views 151 and 153 (of data-expander/encoder 121 and data-expander/decoder 125, respectively) in the context of RS encoders/decoders parameterized by block size, message size and symbol size—that is, "n, k, m" where 'm' is the size of a correctable symbol in bits, 'k' is the number of symbols per message (as described above), and 'n' is the total number of symbols per block such that n=k+w, where 'w' is the number of symbols used for ECC ('w' is also the number of detectable corrupted/bad symbols in some implementations, and twice the number of correctable bad symbols, 't'). Thus, RS encoder 161 within data-expander/encoder 121 is enlarged relative to a baseline RS (n, k, m) encoder to implement RS (n+k, 2*k, m) and ditto for each of the RS decoders (163-0 to 163-$2^q$−1) within data-expander/decoder 125—all enlarged from RS (n, k, m) to RS (n+k, 2*k, m). The expanded message, 2*k, contains the original message (k), metadata bits and deterministic pattern bits.

Still referring to detail views 151 and 153, pattern data generators 165 and 167 are implemented within data-expander/encoder 121 and data-expander/decoder 125, respectively, to produce the pattern data bits ("p-data") merged with the metadata (or each of the possible metadata values within decoder 125) and application data block to yield the expanded (doubled) message size. In differing embodiments, the pattern generators may output either fixed pattern values (e.g., all '1's, all '0's, alternating '1' and '0' patterns or any other fixed/static bit pattern) or dynamic bit patterns. In the latter (dynamic pattern) case, for example, a pseudo-random number generator may be seeded by the memory address of the subject application data block and/or any other fiducial information available within the controller integrated circuit, with temporary storage of any ephemeral value (e.g., memory read address) as necessary to make that value available for pattern data re-generation at ECC decode time. Also, in the case of fixed/static pattern data at least, the same pattern data source (e.g., set of nodes coupled to ground and/or VDD) may supply pattern data to both the enlarged RS encoder and enlarged RS decoder (i.e., only one pattern data source need be implemented).

Referring specifically to detail view 153 of data expander/ ECC decoder 125, each of the $2^q$ enlarged RS decoders (generically, 163) outputs an error syndrome together with error-corrected (if necessary/possible) message data, the latter constituted by 2*V bits that include the V-bit application data block together with V bits of merged pattern data/metadata. Syndrome comparator 169 evaluates/compares the $2^q$ error syndromes, identifying one of those syndromes as reflecting one fewer symbol errors than the others and outputting, as the recovered metadata value, a q-bit index corresponding to the RS decoder that sourced that fewest-symbol-error syndrome. As shown, the recovered metadata is supplied to multiplexer/selector circuit 171 to select, as the read-back (and possibly error-corrected) application data block, the V-bit application data block from the RS decoder that sourced the fewest-error syndrome. Note that the remaining V bits of metadata-selected RS decoder output may be dropped/ignored as those bits merely constitute locally generated content (the pattern data) and metadata (already recovered). In alternative embodiments in which RS decoder indices do not correspond one-for-one with corresponding metadata values, multiplexer 171 may pass both the application data block and the metadata components (V+q bits) output by the syndrome-identified RS decoder (i.e., in response to the q-bit index output from syndrome comparator 169) to downstream logic.

Still referring to FIG. 1, various capabilities and configurations of physical memory (DIMMs in the depicted example) may bear on data-expander/encoder and data-expander/decoder implementations—for example, matching the RS symbol size (m) to the data interface width 's' of an individual DIMM-mounted memory device (or an integer multiple or divisor thereof) to enable application data recovery (and thus ongoing system operation) despite a failed memory device (i.e., where every symbol output from that memory device is bad). In the FIG. 1 embodiment, for instance, the application data block and ECC generated by data expander/ECC encoder 121 are forwarded to I/O circuitry 123 which, in turn, transmits those block components (application data block and ECC) to a selected DIMM via respective data channel and ECC channel components of memory channel 105. Where individual symbols are distributed physically across the data interface of one or more memory devices, implementing the enlarged RS decoder to have (i) a symbol size m that matches (or is an integer multiple) the memory device width 's' and (ii) an error correction capability (t=(n−k)/2) that matches or exceeds the total number of symbols written to/read-back from an individual memory device in a given data block read or write, enables recovery of data written to a failed memory device (i.e., for which all or any subset of the data output is nominally corrupted/bad). Data written to/read from a failed DIMM component (memory device) may similarly be recovered where individual symbols are distributed temporally (sequentially in time) within the data burst over one or more signaling links of a given memory device—in that case by implementing the enlarged RS decoder to have symbol size that matches or is a divisor of the burst length and an error correction capability that matches the total number of symbols written to/read back from an individual memory device in a data block write/read.

Referring to the I/O circuit embodiment shown in detail view 117, a serializer/deserializer circuit 127 serializes each outgoing application data block data for burst transmission (per-link serializer/deserializer 131 generating multiple serial bits per link via output driver circuits 133 (and deserializing serial bits received via counterpart receivers 135 during read data receipt)) to a number (N) of memory devices over an N*s bit data channel, where the burst length 'BL' (number of bit-time intervals or "beats" per application data block transmission) is set according to the ratio of the application data block size (V) to the data channel width (N*s) so that BL=V/(N*s). Likewise for the outgoing ECC—serialized for transmission to a number (E) of memory device over an E*s bit ECC channel, again with burst length 'BL'. Accordingly, by setting (i) RS symbol size 'm' in accordance with the memory device width 's' and/or burst length so that each memory device will store an integer number (BL*s/m) of symbols per data-block write (and output that same integer number of symbols per data-block read), and (ii) setting the RS error correction capability t=(n−k)/2 to meet or exceed BL/s (the number of symbols stored per memory device per application data block write, application data blocks written to the subject DIMM may be recovered on data read-back despite systemic failure of a single memory device, thus permitting ongoing memory system operation albeit with greater exposure to random (non-systemic) symbol error.

Device-failure tolerance is achieved in various embodiments of the FIG. 1 memory system by implementing the data-expander/encoder/decoder circuitry in accordance with application data block size (V), memory channel width in bits and number of connected memory devices (N+E)—i.e., implementing the RS encoders/decoders to effect an m-bit symbol size and an error correction capability that meets or exceeds the number of symbols stored in each individual memory device per write data burst (i.e., BL*s/m). As a specific example, in a memory system populated by one or more DIMMs each having two independent 40-bit memory channels (32-bit data channel, 8-bit ECC channel), 16-byte application data block size (so that burst length=4), and either 4-bit or 8-bit memory-device interface widths (e.g., in compliance with the JEDEC DDR5 standard), a distinct/ dedicated controller-side signaling interface 115 may be implemented for each data channel with RS encoder/decoder parameters (n'=w+k', k'=2k, m), where m=8, w=4, k=16*8/m and n=w+k=20*8/m. That is, RS (36, 32, 8), with each 16-byte application data block and ECC conveyed to ten ×4 memory devices or five ×8 memory devices. ECC encoding/decoding may be implemented with numerous other RS parameters according to characteristics of the subject memory system and error detection/correction objectives.

FIG. 2 illustrates an exemplary syndrome comparator embodiment 180 that may be used to implement syndrome comparator 169 of FIG. 1. As shown, the syndrome comparator includes an error comparator circuit 181 that compares the $2^q$ incoming syndromes (S0 to S($2^q$−1)) and encodes, as the recovered metadata value, an q-bit index corresponding to the syndrome reporting one fewer bad symbols than the others. That index (metadata value) is supplied to multiplexer 183 to select the corresponding syndrome (i.e., reporting one fewer bad symbols than the others) as the finalized syndrome of the RS decoding operation.

FIG. 3 presents an exemplary listing/tabulation of actions implemented by the FIG. 2 syndrome comparator for various syndrome status conditions and corresponding bad-symbol counts. Where the incoming application data block contains no (zero) bad symbols, the syndrome from the RS decoder receiving the correct metadata value (i.e., matching the metadata encoded into the ECC during data write) will report zero bad symbols, while the syndromes from the other RS decoders will each report one bad symbol (as none of the metadata values supplied to those decoders matches the metadata encoded into the ECC during data write). Accordingly, the syndrome comparator outputs the syndrome reporting zero bad symbols together with the corresponding metadata value (e.g., encoding the output metadata as the index of the RS decoder that supplied the zero-error syndrome).

Continuing with FIG. 3, where the application data block contains a correctable number of bad symbols (1 to (n–k)/2 bad symbols), one of the syndromes will report that number of bad symbols, while the others report one additional bad symbol (i.e., 2 to 1+(n–k)/2 bad symbols) due to the incorrect metadata values supplied to their RS decoders. Accordingly, as in the zero-bad-symbol case, the syndrome comparator outputs the syndrome reporting the fewest bad symbols and the corresponding metadata value. As the application data block contained a correctable number of bad symbols, those symbols are corrected in RS decoded application data (i.e., both the finalized application data block and the metadata are error-free/good).

The next two entries in the FIG. 3 table correspond to application data blocks having a detectable but not correctable number of bad symbols—from 1+(n–k)/2 bad symbols to n–k bad symbols, with the n–k case presented separately to emphasize optional/programmable syndrome-comparator behavior. These two entries (third and fourth rows of table) assume a decoder implementation—Reed Solomon or otherwise—capable of reporting a specific number of symbol errors greater than the correction limit (n–k)/2 and less than or equal to the detection limit (i.e., symbol error count between 1+(n–k)/2 and n–k). In the case of decoder implementations that merely report a pass-fail result—that the number of symbol errors is either within the correction limit (a "pass" result as such errors are located and corrected) or exceeds the correction limit ("fail")—the syndromes generate by the parallel decode operations are indistinguishable under the cases shown in rows three and four of the FIG. 3 table (i.e., all merely reporting >(n–k)/2 symbol errors) so that the syndrome comparator action corresponds to that shown in the final row of the table at least to validity of the application data and metadata (i.e., data bad, metadata bad).

In the case of a decoder capable of reporting a specific number of symbol errors greater than the correction limit, 't' (and less than the detection limit, 'w') and the bad-symbol count shown in row 3 of the Figure table, (symbol error count greater than (n–k)/2 and less than n–k first (i.e., third row of table), the syndrome comparator behaves as in the first two table rows, outputting the syndrome reporting the fewest bad symbols and corresponding metadata. In this instance, the metadata is confirmed to be correct (good) while the application data block is reported (by the output syndrome) to have between 1+(n–k)/2 and (n–k–1) uncorrected symbols-data is bad. In the n–k bad-symbol case (fourth row of FIG. 3 table), the syndrome from the RS decoder receiving the correct metadata value will report n–k bad symbols, while the syndromes from the other RS decoders will each report a "bogus" value indicating an indefinite number of symbols greater than n–k. In one embodiment the syndrome comparator action in this instance is established by a programmed policy setting (e.g., within a programmable register or other configuration circuit) to interpret the bogus-valued syndromes as reflecting either (i) exactly n–k bad symbols within the application data block plus one bad symbol resulting from invalid metadata (i.e., so that the n–k+1 bad symbols exceeds the bad-symbol reporting threshold), or (ii) an unknown number of symbol errors within the application data block and thus a lack of trust in the syndrome reporting n–k bad symbols. In the first instance (bogus-valued syndromes interpreted as reporting n–k bad symbols in application data block), the syndrome comparator executes the same action as in the prior table rows-outputting the syndrome that reported the fewest bad symbols (n–k) together with the corresponding metadata value. Note that with this action, the overall data-expander/RS decoding exactly the matches the behavior and performance of a conventional RS decoder (i.e., no functionality is compromised). In the second instance (lack of trust in syndrome reporting n–k symbols), the syndrome comparator outputs a bogus-valued syndrome to indicate both the application data block and metadata are bad (outputting, for example, the metadata corresponding to the (n–k)-reporting syndrome). If all the syndromes report bogus values (final line of FIG. 3 table), the syndrome comparator outputs any of those syndromes (e.g., the syndrome sourced by the RS decoder having the lowest index) to indicate that both the application data block and metadata are bad (outputting, for example, the index of the syndrome-sourcing RS decoder as the metadata).

While FIGS. 1-3 have been described with respect to Reed-Solomon encoder/decoder implementations, any practicable block-code encoding/decoding schemes (e.g., other linear block code encoders, other polynomial code encoders) may be used in alternative embodiments. Also, in some embodiments (including embodiments with block-code or polynomial encoder/decoders other than the RS encoders/ decoders shown), the input message length after combining the metadata bits, application data block and any pattern data may be less than twice the size of the original application data block (i.e., between V+q and 2V–1, inclusive). More generally, the reference to application data block herein refers to data from any practicable source within the host system (e.g., operating-system data, hardware-function-related data, process data, etc.) and the host system itself may be any computing device or other device requiring data storage and retrieval (e.g., smartphone or other handheld computing device or appliance, laptop computer, network appliance, smart television or other home appliance, etc.). Similarly, though DIMM-mounted memory devices and interconnects thereto are depicted in FIG. 1, physical memory may be implemented in any practicable arrangement and form factor (e.g., system-in-package having one or more memory dies, IC-package-based memory module, etc.). Also, while referred to herein as metadata, the ECC-encoded (over-capacity) data may be constituted by any type of data from any source, and while the amount of ECC-encoded data (q) is generally expected to be small (e.g., 2 bits per application data block to support Compute Express Link (CXL) or similarly small number of bits to support other cache-coherent interconnects), q may generally have any practicable value up to $2^m$, where 'm' is the ECC symbol size in bits. Additionally, while RS encoding/decoding operations have been described in terms of individual encoders/decoders that operate on an expanded message size (e.g., twice the application data block size in the FIG. 1-3 embodiments), each RS (n', k', m) encoder/decoder may be implemented by two or more component encoders/decoders. FIG. 4, for example, illustrates an RS (80, 64, 4) encoder implemented by two component RS (40, 32, 4) encoders, or by four component RS (20, 16, 4) encoders, etc. RS decoders may likewise be implemented by component decoders to achieve a desired decode sequence, including component decoders that operate with respect to staggered input data arrival times as shown, for example, in FIG. 5—four component RS (20, 16, 4) decoders operating respectively on successively received portions of application data block, with component syndrome values merged within merge circuitry 201 to yield final per-decoder syndrome. In yet other embodiments, the $2^q$ parallel RS decoders shown in FIG. 1 may be implemented by one or more iteratively cycled RS decoders, each such decoder generating a corrected application data block and syndrome per iteration with respect to per-iteration incremented metadata value. FIG. 6 illustrates such an approach using a single RS decoder to carry out $2^q$ RS decode operations each with respect to the same application data block, ECC value and pattern data (buffering those values as necessary to ensure their availability, 203), and with a counter-incremented q-bit metadata value (q=2 in the depicted example). The syndrome and corrected application data block generated in each RS decode iteration may be buffered as necessary (205) to enable syndrome comparator operation and finalized application data block selection (e.g., as shown in FIG. 2).

The metadata-sequencing component of FIG. 6—depicted as a counter ("cntr") may generate candidate metadata values according to any useful count sequence (e.g., count-up, count-down, gray-code counting or other encoded counting rather than binary counting, etc.) and more generally may increment the per-iteration metadata in any practicable sequence, including non-linear sequences, tabulated and/or algorithmically-generated sequences (the latter including, for example and without limitation, heuristically-generated metadata sequences, adaptively-generated sequences, etc.). In a number of iterative RS decoding embodiments, for example, a metadata-sequencing engine leverages known or observed metadata value proclivities/likelihood to ascertain the correct metadata output (i.e., an RS decode yielding a zero-error syndrome or one-fewer-error syndrome and thus detection of correct/recovered metadata bit pattern—a metadata "hit") with minimal RS decoder iteration, avoiding the incremental latency and power consumption of successive decode iterations while retaining the reduced die area benefit relative to a fully-parallel implementation (i.e., decoding engine having $2^q$ parallel RS decoders).

In a number of embodiments, memory read and write transactions operate with cache line granularity—writing or reading whole cache lines, with some number 'q' of metadata bits being associated with each cache line. In those cases, the memory control component (e.g., component 101 of FIG. 1) may implement capacity-expanding RS encoding/decoding with respect to two or more constituent sub-blocks or fragments of an individual cache line, encoding respective fragments of a metadata value (i.e., one or more metadata bits) together with those cache line fragments to generate per-fragment codewords (each codeword including the cache line fragment and ECC value, the latter reflecting the metadata fragment) that are written to memory. At cache line readout (i.e., when requested by host), the constituent codewords are each separately RS decoded (with data expansion as discussed) to generate an error-corrected cache line fragment and recovered metadata fragment. Because the total number of candidate metadata values within each decode is reduced by the fragmentation factor, F (i.e., F=number of cache line fragments per cache line), the total number of RS decode operations required to recover the full metadata value becomes 2*q instead of $2^q$ (i.e., (so long as q≤F) and is thus reduced by a factor of $2^{q-1}/q$.

FIG. 7 illustrates an embodiment of a fragmenting data-expanding RS encoder/decoder set 250 (FDX encoder 251 and FDX decoder 253) that implements data-expanded RS encoding and decoding operations with respect to F=q fragments of an application data block-generating and then decoding F codewords, each including an ECC value and V/q-sized application data block fragment, where V is the bit-depth of the overall application data block and q is metadata bit depth. As shown, FDX encoder 251 includes 'q' RS encoder components 255 each coupled to receive a respective one of the q application data block fragments ($ADF_0$-$ADF_{q-1}$), a respective one of the q metadata bits (md[0]-md[q-1], such that the metadata fragment size is a single bit), and pattern data to pad the remainder of the 2V-sized message. The fragmenting data-expanding decoder 253 likewise includes 'q' decode engines 257, each coupled to receive a respective one of the inbound (i.e., read out of memory) codewords (ECC and ADF) together with pattern data. As shown in detail view 260, each decode engine 257 includes two component RS decoders 261a, 261b that receive, along with the pattern data and ADF/ECC codeword, respective values of the metadata bit for the subject codeword—that is a logic '0' metadata input to one component decoder and a logic '1' metadata input to the other (the only two possibilities). By this arrangement, the two component decoders (collectively and generically 261) operate generally as discussed above to generate respective syndromes having divergent numbers of symbol errors and more specifically in which the decoder receiving the "correct" candidate metadata bit will yield one fewer symbol error than the decoder receiving the opposite-state (incorrect) candidate metadata bit. Accordingly, a syndrome comparator 263 resolves and outputs the correct metadata bit, applying that metadata bit to select the corresponding application data fragment for output from the decode engine (along with the corresponding syndrome). In the FIG. 7 embodiment, the codeword decode operation (including resolving the metadata bit and corresponding application data block/syndrome) is carried out in parallel within the q decode engines 257 for each of the inbound codewords, FDX encoder 253 outputs the q-bit metadata value (each bit sourced by a respective one of decode engines 257) together with a composite syndrome value and complete V-bit application data block, the latter formed (like the q-bit metadata value) by aggregating the q fragments output from respective RS decode engines. As discussed above, the total number of RS decodes executed to recover the q-bit metadata value is 2q (i.e., q RS decode engines each implementing two RS decode operations) instead of $2^q$, thereby reducing the requisite number of parallel RS decode circuits for metadata values constituted by three or more bits. And the decode circuit footprint may be further reduced where codewords are read out in serial sets (i.e., each such set of codewords being followed by one or more other sets within the read-out data burst) as a given set of one or more decode engines may operate on those serial codeword sets one at a time (iterative decode). As an example, a single pair of decode engines 257 (four component RS decoders 261) may decode a four-codeword cache line that is read out two codewords at a time—i.e., output data burst includes an initial two codewords over a leading half of the burst interval, and a final two codewords over the trailing half of the burst interval, with the two decode engines operating iteratively on the two sets of codewords.

FIG. 8 presents a conceptual encoding/decoding operation implemented within the FIG. 7 hardware set with respect to a 64-byte (64B) cache line and 4-bit (4b) metadata value. As shown, the cache line is decomposed into four 16B fragments, with each such fragment separately RS-encoded together with a respective bit (MD[0], MD[1], MD[2] or MD[3]) of the metadata value and a 15B, 7-bit pattern data value (e.g., a padding value formed from all '0's or all '1's or any other fixed or dynamic pattern as discussed above). In one embodiment, RS-encoding is implemented with byte-sized symbols (m=8) and two-symbol error correction capability (i.e., n–k=4) so that each cache-line fragment encoding operation (with metadata bit and pattern data) yields a 20B codeword consisting of the original 16B cache line fragment and a 4B (four-symbol) ECC value, the latter reflecting the metadata bit (to be clear, no padding data is included within the codeword). When read back from memory (i.e., after writing the RS-encoder-generated codewords to memory, and in response to host request to retrieve the subject cache line), the four codewords are subject to respective RS-decode operations—two RS-decodes for each codeword (to reflect the two possible values of the metadata bit RS-encoded with the cache line fragment) and thus eight RS decodes in all. As discussed above, each RS decode yields an error-count-specifying syndrome (depicted conceptually in FIG. 8 as "#err"), with the syndrome pair corresponding to a given codeword supplied to back-end circuitry ("Sel") that selects one of the two decoder outputs as the error-corrected cache line fragment (CL Frag'), recovered metadata bit and fragment syndrome.

In the FIG. 8 embodiment, each of the selector circuits (shown in a single exemplary instance in detail view 280 includes circuitry to detect and report an error-count aliasing condition that would otherwise constitute a silent data corruption—the statistical tendency of an RS decoder to erroneously report a codeword bearing three or more symbol errors as having only two (i.e., reporting 1+(n–k)/2 symbol errors (uncorrectable) as (n–k)/2 symbol errors (correctable)). More specifically, an error comparator circuit 281 determines whether incoming syndromes s0 and s1 (each from a respective RS decode with data differing only with respect to metadata bit value) each report two symbol errors—an error-count aliasing condition—and, if so, responsively asserts an alias-detect (AD) signal to output (i.e., select as the final syndrome output via multiplexer 283) a value that indicates an uncorrectable error (UE) and thus a corrupted RS decode result. As any such error-count aliasing would, in absence of the additional/redundant RS decode applied to recover the metadata bit, mask the data corruption (i.e., erroneously reporting a codeword having an uncorrectable/uncorrected number of errors as an error-corrected result), the additional decode applied to recover the metadata bit from each codeword brings additional benefit of detecting silent data corruption events—signaling and enabling avoidance of conventionally undetected data corruptions that, though statistically rare, may occur with respect to data at any operating-system privilege level and thus yield damaging consequences.

In the FIG. 8 example, error comparator 281 outputs a metadata bit and alias-detect (AD) signal state in accordance with the table at 285—outputting the syndrome (s0 or s1 via mux 287) that reports the fewest bad symbols so long as one syndrome reports two or fewer bad symbols and one fewer bad symbol than the other (first two table rows following header); asserting the alias-detect signal if both syndromes report two bad symbols (the error-count aliasing condition), and outputting either syndrome and corresponding metadata value if both syndromes report an uncorrectable number of errors (i.e., indicating that data is corrupt). The tabulated operation of error comparator 280 is provided for purposes of example only-various alternative error comparator actions may apply in alternative embodiments, particularly where RS encoding/decoding is implemented with greater or lesser symbol-error detection/correction capability.

FIG. 9A illustrates an alternative RS metadata encoding/recovery approach in which a multi-bit metadata value is redundantly applied in cache-line-fragment RS encoding and decoding operations to exponentially lower the likelihood of error-count aliasing. More specifically, observing that (i) RS-decode aliasing occurs infrequently in absence of systemic error, and (ii) one of the two equal-error-count syndromes generated in that aliasing event corresponds to a valid, error-corrected cache line fragment (and metadata bit), the FIG. 9A embodiment redundantly encodes/decodes the same multi-bit metadata value with respect to each of the different cache line fragments (and pattern data) to enable metadata recovery with respect to any one of those fragment encode/decode operations despite aliasing in any or all others of the fragment decode operations.

In the FIG. 9A example, a 3-bit metadata value encodes five possible states as shown in table 300: four metadata states represented by the four possible combinations of two constituent bits of the metadata value (b1, b0), and a fifth metadata state represented by assertion of a third constituent bit (p, the "poison" bit) of the metadata value—the poison bit assertion (e.g., to logic '1') indicating, for example, that the cache line is invalid, rendering cache-line status/ownership information encoded in the other two bits meaningless (don't care) and subject to manipulation (e.g., forced to deterministic values '00' or '11') during RS encode so as to limit the total number of possible metadata values to five. Accordingly, cache line fragment encoding is implemented generally as discussed above, except with redundant application of the same 3-bit metadata value (instead of a distinct single metadata bit) in each RS encode and corresponding adjustment of the pattern data size (15B, 5b instead of 15B, 7b, with the 5 bits of pattern data rounding out the symbol containing the three metadata bits). Cache-line fragment decoding is likewise implemented as discussed above, except with five per-fragment decode operations (instead of two) to identify one of five possible metadata values (instead of two possible states of a single metadata bit)—an operation shown conceptually at 320 in the fragment-0 decode. Additionally, instead of resolving constituent metadata bits at the back end of respective metadata decoding operations, the five error syndromes generated in each fragment decode (i.e., as represented by "err #" in FIG. 9A) are supplied to vote/select circuit 321 that performs a cache-line wide compare of the syndromes generated by the per-fragment RS decode operations (i.e., 20 syndromes in this four-fragment, 5-decode per fragment example) to recover an output metadata value and to apply that recovered metadata value in selection of the corresponding decoded and error-corrected cache line fragment outputs (and also select the correct per-fragment syndromes). In the example shown, the vote/select circuit determines whether, for the N=5 RS decode operations executed with respect to a given codeword (i.e., cache line fragment+ECC value returned from memory read), the syndrome for one of those decodes shows (i) a correctable number of symbol errors (e.g., fewer than 3 symbol errors in an (n–k)/2=2 RS decoder), and (ii) fewer symbol errors than all others of those N decodes—an operation shown within an exemplary vote/select operational flow (325) at 327. Voter/selector responds to an affirmative determination at 327—i.e., indicating that the correct metadata value has been identified (i.e., one fewer symbol error, no error-count aliasing)—by outputting the metadata value corresponding to the RS-decode that yielded one fewer symbol errors than all others (the "$i^{th}$" of the N RS decode operations for the subject fragment) and by outputting the cache line fragment and syndrome corresponding to the $i^{th}$ RS decode operation from each of the four fragment decode operations (329). If none of the cache-line fragment decodes yields an affirmative determination at 327 (i.e., no instance in which one of N RS decode operations for a given cache fragment yields an error count below the correctability threshold and one fewer than the other N–1 RS decode operations for that fragment), vote/select logic 321 determines at 331 whether the error count indicated by the $i^{th}$ RS decode operation—and only for the $i^{th}$ RS decode operation—is within the error correction limit (less than three in this example) for all fragment decode operations as shown at decision block 331. If so (i.e., affirmative determination at 331), vote/select logic 321 implements the metadata, cache line fragment and syndrome outputs shown at 329. Otherwise, if neither of the evaluations at 327 and 329 (assessments implemented in parallel within combinatorial logic, for example) yields an affirmative result, an uncorrectable error is signaled at 333.

FIGS. 9B and 9C illustrate RS decode examples that yield affirmative determinations within the decision blocks at 327 and 331 of FIG. 9A, respectively. In the FIG. 9B example, despite aliasing within the decode operations for cache-line fragments 0, 1 and 3 (i.e., aliasing indicated by two or more instances of two-symbol-error detections with respect to different metadata values), the error count for the fourth ($i^{th}$) of five decode operations for cache line fragment 2 (i.e., for which MD-011b) is within the error-correction limit (less than 3 in this example) and less than the error counts for each of the other four decodes with respect to that fragment—yielding an affirmative determination in decision block 327 (of FIG. 9A) to produce '011b' as the recovered metadata value (and selection of corresponding cache-line fragment and syndrome output). In the FIG. 9C example, an aliasing event occurs within each set of five decode operations for each of the four cache lines (i.e., yielding a negative determination at decision block 327 of FIG. 9A). However, because the error count for the same one—and only that one—of the five per-fragment decodes is within the error correction limit for all four fragments (i.e., the decodes for i=3, corresponding to metadata value 010b), an affirmative determination occurs in decision block 329 to produce '010b' as the recovered metadata value (and selection of corresponding cache-line fragment and syndrome output). Conceptually, at least, the cross-fragment assessment shown at 331 in FIGS. 9A and 9C may be implemented by scoring or voting logic—for example, combinatorial circuitry that tallies the number of uncorrectable error determinations across all four fragments for each different metadata value (i.e., five "scores" each corresponding to a respective candidate metadata value), comparing the results to confirm that one and only one such tally (score) shows zero uncorrectable errors. In the FIG. 9C example, for instance, only the score for metadata value 010b indicates zero uncorrectable-error detections (the four decodes for each of the other candidate metadata values yielding a score of two or higher), thus enabling the vote/select logic to recover a valid metadata value (010b) despite aliasing within the decode operations for all four cache line fragments.

Referring again to FIG. 9A, the redundant metadata recovery implemented within the depicted RS decoder exponentially reduces the already low probability of error-count aliasing (to the fourth power in this four-fragment example and to a higher power if the cache line is encoded into more than four codewords)—rendering the aliasing likelihood to the point of negligibility. Moreover, while the number of RS decode operations increases relative to the decode-per-metadata bit approach in FIG. 7 (e.g., 20 RS decodes in the 5-state metadata example of FIG. 9A), RS decode operations may be executed iteratively to reduce the requisite number of RS decode circuits, particularly where codewords are serialized within a data burst and thus may be decoded one after another (or, more generally, subset after subset). If at the end of the voting/scoring process, an affirmative decision about metadata cannot be made, the voting/scoring logic declares an uncorrectable error.

FIG. 10 illustrates an embodiment of an aliasing-mitigating, capacity-expanding memory controller 350 (e.g., as implemented at the memory interface of a host IC and/or within a buffer chip, etc.) and its interconnection to various DIMMs 355 implemented according to representative standards. The DIMM shown at 360, for instance, is coupled to controller 350 via two 40-bit "sub-rank" memory channels (ten 4-bit memory ICs 361 coupled to respective 4-bit slices of a given sub-rank memory channel and designated sr #-0 through sr #-9, where '#' denotes the sub-rank number 0 or 1), while DIMM 363 implements the same pair of sub-ranks with a halved number of doubled-width memory ICs (5×8 memory ICs per sub-rank). The DIMM at 365 implements a single 72-bit memory channel with 18 devices per memory rank. Memory controller 350 may be coupled to DIMMs according to various other configurations (number of constituent memory devices per rank/sub-rank, number of memory channels, etc.) in alternative embodiments, and the depicted DIMMs (and any others) may include various unshown components (e.g., data buffers disposed between DIMM data interfaces and externally signaling links, registered clock driver components coupled to command/address and other control lines, serial presence detect, non-volatile backing memory, etc.). In particular, each of the depicted DIMMs includes a counterpart memory rank or pair of sub-ranks on the opposite face of the DIMM substrate (i.e., so that each of DIMMs 360 and 363 includes a total of four 40-bit sub-ranks, with two sub-ranks coupled to each memory channel; and DIMM 365 includes two 72-bit memory ranks).

Still referring to FIG. 10, data transfers over a given memory channel may be organized spatially and temporally to convey serial pairs of codewords containing respective cache line fragments and associated ECC values. In the DIMM configurations having two 40-bit memory channels, for example, physical signaling interfaces (PHYs) within the controller and memory device execute counterpart serialization and deserialization operations with respect to outbound and inbound codewords to convey constituent symbols of those codewords serially over each controller-to-DIMM data link. In one embodiment, for example, the four 20B codewords shown in FIG. 8—each containing respectively a 16B cache line fragment and 4B ECC value—are conveyed in a single sub-rank data burst over the 40-bit memory channel, conveying 40-bits per unit interval (UI) over 16 back-to-back UIs as shown at 370 with respect to the four data links coupled to a given memory IC within the sub-rank. Accordingly, two full codewords-A and B, with codeword A constituted by bytes A0-A19, and codeword B constituted by bytes B0-B19—may be transmitted over a first temporal half (first 8 UIs) of the sub-rank data burst, and the remaining two codewords (C and D constituted by C0-C19 and D0-D19, respectively) conveyed over the second half of the sub-rank burst interval so that the two codeword pairs (A/B and C/D) may be decoded sequentially within the RS decoder set (i.e., executing decode operations iteratively with respect to the A/B and C/D codeword pairs), halving the requisite number of RS decoders relative to the architecture shown in FIG. 9A. In other embodiments, the four codewords may be conveyed in four sequential intervals, with the entirety of codeword A being transmitted over an initial four UIs (4 bits*40 links=20B), followed by entirety of codeword B over the subsequent four UIs and then codeword C and then codeword D. In that case (and assuming, for example, the 5 RS decode operations per codeword shown in FIG. 9A), five RS decoders may iteratively decode (in four iterations) the four incoming codewords. In either of those serial-codeword implementations, the RS decoder outputs for initially decoded codewords may be buffered to ensure their availability for fragment/syndrome selection with respect to a metadata value ascertained from a later decoded codeword.

FIG. 11 illustrates an example of a data-expanding RS-encoding/decoding architecture that iteratively encodes cache line fragments and metadata into codeword pairs (e.g., A/B and C/D as in FIG. 10) in a memory write transaction and then, during cache line read back (memory read transaction), iteratively decodes those cache line fragments to recover the original metadata and generate error-corrected cache line fragments. In the depicted embodiment, a 64B cache line is supplied to FDX encoder 401 in parallel 16B fragments ($CLF_0$-$CLF_3$), with component even and odd RS encoders (403, 405) executing two sequential RS encoding operations to generate two sets of even/odd codewords and corresponding even/odd ECC values. For example, even-fragment RS encoder 403 encodes even-numbered cache line fragment $CLF_0$ (together with a three-bit metadata value and pattern data) to yield a leading even-fragment codeword $CW_{even}$ (consisting of $CLF_0$ and a corresponding ECC value, $ECC_{even}$) and then, in an ensuing encode interval, encodes even-numbered cache line fragment $CLF_2$ (with pattern data and the same 3-bit metadata value) to yield a trailing even-fragment codeword. Odd RS encoder 405 executes counterpart iterative encoding operations to generate (simultaneously with iterative generation of even-fragment codewords within RS encoder 403), leading and trailing odd-fragment codewords ($CW_{ODD}$ corresponding to $CLF_1$ and then to $CLF_3$, respectively).

FDX decode engine 411 executes operations inverse to those implemented within FDX encoder 401, iteratively decoding the even-fragment codewords (supplemented by corresponding ECC values, pattern data and candidate metadata values) within even-fragment decoder 413 and, at the same time, iteratively decoding the odd-fragment codewords within odd-fragment decoder 415. As shown with respect to detail view of even-fragment RS decoder 413, five component decoders execute RS decode operations with respect to the five possible states (in this example) of the 3-bit metadata value so that each of the even-fragment and odd-fragment RS decoders generates a respective set of five outputs each consisting of a putatively error-corrected cache line fragment and corresponding syndrome. In the unlikely event that none of the ten syndromes (five from each of decoders 413 and 415) generated in the initial decode iteration resolve the metadata value (i.e., no syndrome indicates fewer than three symbol errors and one fewer symbol error than all others with respect to a given codeword), the error-corrected cache line fragments (and optionally the syndromes also) may be stored within buffer 417 to enable later selection of individual cache-line fragment instances (i.e., one of the five cache line fragments output by decoder 413 and one of the five cache line fragments output by decoder 415) pursuant to successful resolution of the metadata value in the trailing even-fragment and odd-fragment decode operations. The latter of the two RS decode operations is executed in the same manner as the first, but with vote/select circuitry 419 generating a finalized output (i.e., now that the results of all 20 decode operations are known). Though four parallel cache line fragment outputs are shown, the even and odd cache line fragment pairs (i.e., initial pair corresponding to the initial RS decode iteration, and the latter pair corresponding to the latter RS decode iteration) may be output sequentially over a shared set of output lines. The vote/selector may output a finalized syndrome in view of the totality (20) of syndromes generated or may output a respective syndrome per cache line fragment (i.e., either in parallel as shown, or sequentially) or any combination thereof.

While the probability of Reed-Solomon decoder aliasing (i.e., incorrectly reporting codeword having symbol errors in excess of the correction limit, 't', as has having only 't' symbol errors and thus as having been corrected) is generally low due to the exceedingly low probability of more than 't' random errors in any given codeword, failures/problems with respect to system hardware resources may significantly increase baseline symbol error counts and thus susceptibility of aliasing in the decoder-based metadata recovery embodiments discussed above. A number of embodiments discussed below include circuitry to distinguish between two or more candidate metadata values that otherwise yield matching symbol-error counts (i.e., upon decode using the same application data, ECC value and, if needed, pattern/padding data) by comparing their respective sets of error locations to systemic-error location patterns (i.e., systemic-error signatures resulting, for example, from hardware fault/failure). Where error location patterns for all but one of the otherwise-viable candidate metadata values fail to match the systemic-error signature(s), the metadata candidates corresponding to non-matching error-location patterns (i.e., not matching systemic-error-location signature) may be disqualified as having rendered erroneous/aliased RS decode results (i.e., yielding syndromes that incorrectly report a correctable number of symbol errors) in favor of the one metadata candidate for which the error location pattern matches the systemic-error signature-deeming the RS decode for that metadata candidate (i.e., syndrome reporting error locations that match systemic-error signature) to be, except for the fault-triggered symbol errors therein, symbol-error free and thus a valid/trusted recovery of the originally RS-encoded metadata value.

FIG. 12 illustrates systemic "link fault" errors that may occur and be detected within the FIG. 10 memory system—that is a memory controller 350 coupled to a multiple-sub-rank DIMM 360 having ten 4-bit memory components per sub-rank to convey, under an RS encoding/decoding arrangement with byte-sized symbols, four 20-byte (20B) codewords per memory read/write transaction according to the spatial/temporal arrangement shown at 361 and 370. Because each discrete memory component is coupled to the memory controller via a respective set of four data links, hard or intermittent failure within the data interface of a single memory component (or within the portion of the memory controller data interface coupled to that memory component)—that is, "link faults" specific to any one or more or all of the four signaling links-will garble/disrupt data transfer in either or both directions according to the nature of the failure, yielding, upon data read-back, one or more systemic RS-decode symbol errors. For example, failure of one, two, three or all four signaling transceivers within the data interface of a single memory component of a given sub-rank will, in absence of random errors, yield systemic symbol errors as shown (i.e., under the headings "single link fault," "two adjacent-link faults," "two alternate-link faults," "three link faults," and "four link faults," respectively). More specifically, in the case of a single link fault, the two symbols conveyed via the faulted link—each symbol being a constituent of a different codeword-will be corrupted, yielding a single systemic symbol error in two of the four codewords decoded during cache-line readout (i.e., one systemic symbol error in each of codewords B and D in the case of DQ1 (or DQ3) transceiver failure shown at 401, or in codewords one systemic symbol error in each of codewords B and D in the case of DQ0 or DQ2 transceiver failure). Accordingly, if there are no random symbol errors, RS decoding of the systemically corrupted codewords will yield a single symbol error with respect to the correct metadata candidate and two symbol errors with respect to all incorrect metadata candidates so that no error-count aliasing is possible (also, the alternate two codewords are uncorrupted so that RS decoding with respect to those codewords will also yield the error-count differentiation that enables metadata recovery-zero symbol errors with respect to the correct metadata candidate and a single symbol error with respect to all other metadata candidates absent additional random symbol errors).

Two link-faults with respect to adjacent links (as shown by failure of link-adjacent transceivers DQ0/DQ1 in the example at 403) will likewise yield no more than one systemic symbol error per codeword (in all four codewords rather than just two) so that, absent random symbol errors, no aliasing is possible with respect to any codewords (i.e., as aliasing becomes possible only when the number of actual symbol errors matches the correction limit 't'—where t=2 in the FIG. 12 example—so that decodes with respect to incorrect metadata will yield >t symbol errors that may, due to RS-decode aliasing, be incorrectly reported as 't' corrected symbol errors).

In the case of link faults on alternate/non-adjacent links (as shown by the failure of alternate-link transceivers DQ0 and DQ2 at 405), two systemic symbol errors will occur within the pair of codewords conveyed over the faulted links (i.e., codewords A and C or codewords B and D), rendering the decodes of those codewords susceptible to aliasing. However, because the pair of codewords conveyed via the non-faulted links (i.e., driven by transceivers DQ1 and DQ3 in the FIG. 12 example) have no systemic symbol errors, aliasing is not possible with respect to those codewords absent random symbol errors, enabling the correct metadata candidate to be identified so that any aliased results within the systemic-error codewords may be ignored.

In the three link-fault scenario (e.g., all transceivers failed within subject memory IC except transceiver DQ1 in the example at 407), two systemic symbol errors will be present within one pair of codewords (A/B or C/D), but only one systemic symbol error will be present in the alternate codeword pair, meaning that again, absent random symbol errors, no aliasing is possible within the single-systemic-symbol-error codeword pair and therefore enabling the correct metadata candidate to be resolved irrespective of possible aliasing within the two-systemic-symbol-error codeword pair.

Under the four-link fault scenario (e.g., all transceivers failed within the subject memory IC as shown at 409 so that the memory IC is, at least for data readout purposes, entirely dead/defective), two systemic symbol errors will be present in all four codewords so that aliasing is possible in all codeword decodes even without random errors. Under this scenario-two systemic symbol errors in each of the four codewords—the systemic errors will, if correctly reported, have an error-location signature as shown at 415, with errors locations corresponding to spatially-consecutive symbols within each codeword according to the memory IC coupled to the faulting links (e.g., errors in consecutive symbols 0 and 1 for link-faults with respect to memory IC 0, errors in consecutive symbols 2 and 3 for link-faults with respect to memory IC 1, and so forth to errors in consecutive symbols 18 and 19 for link-faults with respect to memory IC 9). Accordingly, absent random symbol errors, an RS decode of a codeword having two systemic symbol errors (e.g., symbol errors having consecutive locations within the codeword according to the faulting memory component) in combination with the correct metadata candidate will report two symbol errors (i.e., and thus a corrected cache line fragment) at locations that match the faulted-component error location signature. By contrast, only a small handful of the RS-decode aliases (i.e., incorrect reporting codewords having >t symbol errors as having only t symbol errors and thus within the correction limit) have error location patterns that match the faulted-component error location signature, optionally enabling otherwise viable RS decode results (i.e., reporting 't' symbol errors) for which error locations fail to match faulted-component error location signatures to be disqualified from contributing to voting/selection within the metadata recovery circuitry. While systemic errors in the FIG. 12 example yield spatially-consecutive error-location signatures as shown at 415, in other embodiments or configurations error-location signatures may be characterized instead (or additionally) by symbol errors in temporally-consecutive codeword symbols, or even by non-consecutive spatial and/or temporal error-location patterns-depending on codeword organization within the transferred data burst.

FIG. 13 illustrates an embodiment of voter/selector circuitry 440 that leverages systemic-error location signatures to disqualify aliasing events and thus enable metadata and application data recovery under scenarios that would otherwise yield uncorrectable errors (UEs). Referring to the interconnect architecture at 441, voter/selector circuitry 440 receives the outputs of an RS decoder pair $443_0$, $443_1$ implemented generally as discussed with respect to the even and odd RS decoders (413, 415) of FIG. 11. Assuming the temporal/spatial codeword conveyance format shown at 445, (i.e., codewords A and B simultaneously received via even and odd data lines, respectively, over the initial 8 UIs of a 16-UI burst, followed by simultaneous reception of the C and D codewords via the even and odd data lines, respectively, during the latter 8 UIs) and the same 5 candidate metadata values discussed above (i.e., valid metadata may have any of the five values 000b, 001b, 010b, 011b or 111b, where 'b' designates binary notation), then voter/selector 440 will receive a total of twenty cache-line (CL) fragments and twenty syndromes from the RS decoders $443_0/443_1$ per memory read, starting with ten CL fragments/syndromes corresponding to codewords A and B and concluding with ten CL fragments/syndromes corresponding to codewords C and D. To distinguish between individual and grouped RS decode operations, the five simultaneous RS decodes executed with respect to a shared (i.e., same) cache line fragment and pattern data (which may be omitted in some instances as discussed below) but respective/different candidate metadata values are referred to collectively herein as a "superdecode" so that even and odd RS decoders $443_0$, $443_1$ are likewise referred to herein as RS superdecoders—superdecoder $443_0$ executing the 5-way parallel RS decode ("superdecode") with respect to code word A and then with respect to codeword C, while superdecoder $443_1$ executes the 5-way superdecode with respect to codeword B and then with respect to codeword D. In the depicted example, each component decode operation (i.e., single one of the five constituent RS decodes of a five-way superdecode) is implemented by an RS(37, 33, 8) decoder—expanded by one symbol relative to RS(36, 32, 8) decoder embodiments discussed above to enable run-time-selectable support for alternate codeword sizes/formats as discussed below. As shown, the pattern data is extended by one byte relative to the FIG. 11 embodiment—that is, to 16 bytes and 5 bits, in which the 5 bits constitute the unused part of the symbol bearing the 3-bit candidate metadata. In terms of whole 8-bit symbols, the pattern data may be viewed as having 16 constituent symbols and the metadata as being constituted by a single whole symbol (of which 5 bits are unused in this 3-metadata-bit example), though in all cases unused bits within the metadata symbol may be supplied by a dynamic pattern data generator or otherwise leveraged for security or any other useful purpose.

Still referring to FIG. 13, voter/selector 440 receives control signals having states according to values programmed within a configuration register (programmable register) 447 including, for example and without limitation, a qualified-vote-enable signal (qve) and one or more error-location signatures ($elsg_0$, . . . , $elsg_{k-1}$). When asserted, the qve signal enables voter/selector 440 to differentiate between otherwise equal RS-decode votes (one true/valid decode and one or more aliased/invalid decodes) for two or more candidate metadata values by comparing reported error locations (i.e., reported within the syndromes for the subject RS-decodes) with one or more of the programmed error location signatures—an operation referred to herein as vote qualification. As an example, an error-location signature corresponding to the mem0 error pattern shown in FIG. 12 (i.e., consecutive symbol errors in symbols 0 and 1 of each codeword) may be programmed within register 'elsg0' so that, when qualified voting is enabled (e.g., qve=1), RS-decodes reporting error locations that do not match the mem0 error pattern are disqualified (excluded from participating in the qualified vote). As another example, multiple error-location signatures (e.g., corresponding to two or more or all of the error-location patterns/signatures shown in FIG. 12) may be programmed within respective 'elsg' registers so that any RS-decode reporting consecutive symbol errors is qualified (enabled to participate in voting when qve=1), while any RS-decode reporting non-consecutive symbol errors is disqualified. In embodiments having fewer elsg registers than the quantity of memory ICs per memory rank (so that, for example, error signatures corresponding to each and every memory IC fault pattern cannot be explicitly programmed), a multi-bit qve value may be implemented to enable either (i) pattern-matching using contents programmed within the one or more 'elsg' registers (e.g., qve=01) or (ii) pattern matching without regard to elsg register content (e.g., qve=11 to enable any RS decode reporting consecutive symbol errors to participate in qualified vote). More generally, while the qve/elsg programming example (enabling qualified voting to be selectively enabled and enabling qualifying error-location signatures to be specified) is carried in a number of embodiments discussed below, any practicable mechanism/logic circuitry for selectively enabling qualified voting and/or specifying error-location signatures may be implemented in alternative embodiments.

In one embodiment, voter/selector 440 executes the operational flow shown at 450 to validate one of the five candidate metadata values, outputting the validated metadata candidate together with the corrected cache line (i.e., aggregation of cache line fragments) and syndrome (aggregation of per-fragment syndromes) corresponding to validated metadata candidate at 451 if successful, and otherwise signaling, within an aggregated-syndrome (AgSyn), an uncorrectable error (UE) at 453. In the depicted example, voter/selector 440 signals an uncorrectable error (453) if the cache line is irrecoverable (i.e., any fragment of the cache line has an uncorrectable number of errors per determination at 455) or is subject to error-count aliasing (negative determination at 457) that cannot be resolved by a direct vote (459) or qualified vote (461). Conversely, if a recoverable/valid cache line (negative determination at 455) yields an alias free superdecode (i.e., one metadata candidate yields one fewer errors than all others within one or more superdecodes as determined at 457) or a direct-vote winner at 459 or qualified-vote winner at 461 (if qualified voting is enabled), voter/selector 440 outputs, at 451, a recovered metadata value (MD), corrected cache line (cCL) and aggregated syndrome (AgSyn) corresponding to the voter/selector-validated metadata candidate. In the depicted example, the corrected cache line is an aggregation (concatenation) of the four cache line fragments output from the RS decode operations executed with respect to the validated metadata candidate (i.e., CL fragments possibly different from/corrected relative to those received from memory in respective codewords A-D), and the aggregated syndrome is an aggregation of the syndromes generated in those RS decode operations.

In the case of a recoverable/valid cache line subject to error-count aliasing (negative determinations at 455 and 457), voter/selector 440 may disqualify known/certain aliasing at 471 before executing a direct vote or qualified vote—for example, by restating error counts for which error locations correspond to pattern/padding data (i.e., values sourced within the memory control IC and thus deterministically error-free absent memory controller failure) to indicate non-correctable numbers of errors. Though not specifically shown, the vote/select logic may repeat the alias-free assessment (457) following disqualification of known/certain aliasing in some embodiments/configurations (e.g., according to configuration setting programmed within register 447) or may be configured (again according to configuration setting programmed within register 447) to disqualify known aliasing prior to executing the alias-free assessment (i.e., executing operation 471 prior to the assessment at 457). In either case, after disqualifying known aliasing (471) and, optionally, re-confirming that no superdecode yielded an alias-free result (i.e., repeating assessment 457), the vote/select circuitry executes a direct vote at 459, confirming at 473 that there is at least one candidate metadata value ("$i^{th}$ candidate") that yields a corrected cache line fragment in all superdecodes (i.e., reported error count not more than the correction limit and thus $\leq t$) and then determining at 475 whether each of the other metadata candidates yielded an uncorrectable number of errors (error count $>t$) within at least one superdecode. Affirmative answers to both assessments/evaluations (473, 475) indicates that the $i^{th}$ metadata candidate is the one and only metadata candidate yielding a correctable number of errors in all superdecodes and thereby confirms that metadata candidate as a direct vote winner, triggering the validated output at 451. Conversely, if no candidate metadata value yields a corrected CL fragment in all superdecodes (negative determination at 473), the voter/selector signals a UE (as there is no possible vote winner) and if more than one candidate metadata value yields a corrected CL fragment (i.e., for which a correctable number of errors is reported) in all superdecodes (negative determination at 475), the voter/selector concludes that there are two or more viable metadata candidates—a tied direct vote.

When two or more candidate metadata values yield a tied direct vote (i.e., aliased decode error counts for which two or more metadata candidates yield purportedly corrected cache lines in all superdecodes), voter/selector may execute the qualified voting operation at 461 to eliminate one or more otherwise viable metadata candidates and thereby validate/confirm a singular qualified vote winner as the output metadata value. More specifically, if qualified voting is enabled (affirmative determination at 477), the voter/selector disqualifies (eliminates from contention) all otherwise viable metadata candidates for which, in any superdecode, the syndrome-reported error locations fail to match one or more pre-selected error-location signatures (479). Accordingly, if the error location pattern for only one viable metadata candidate (the $i^{th}$ metadata candidate) matches the pre-selected error location signatures in all superdecodes (i.e., affirmative determination at 479 that only one metadata candidate remains after disqualifying one or more otherwise viable metadata candidates for yielding error locations that fail to match error location signature(s)), that one metadata candidate is validated/confirmed as the qualified vote winner and selected as the final output metadata value together with corresponding cache line and aggregated syndrome (451).

In an embodiment presented in exemplary detail view 490 (still FIG. 13), voter/selector 440 includes, as constituent circuit blocks, syndrome buffers 495/497, irrecoverable-cache-line detector 501, alias detector 503, known-alias disqualifier 505, direct vote module 507, qualified vote module 509 and output selector 511. As shown, syndromes corresponding to the superdecode operations for each of the four codewords A-D are supplied to irrecoverable-cache-line detector 501, alias-detector 503 and known-alias disqualifier 505 (with the syndromes corresponding to the leading codewords A and B buffered at 495/497 to establish their availability in parallel with the syndromes corresponding to latter received/decoded codewords, C and D). The irrecoverability detector (501) generates a corruption-detect signal (cd) if the RS-decode error count exceeds the correction limit for all candidates within any superdecode, and alias detector 503 asserts an alias-free signal (af)—and outputs a corresponding metadata index, $mdi_{af}$—if the error count for a given metadata value ($i^{th}$ metadata value) is less than all others within any superdecode. Known-alias disqualifier 505 disqualifies known/certain aliasing by revising error counts (to indicate an uncorrectable number of errors) for any RS decode results that indicate error locations within the pattern data. Known-alias disqualifier circuitry may be disabled or bypassed (e.g., in response to configuration register setting) for codeword formats which require no padding/pattern data to meet the RS decoder message/block size.

Continuing with detail view 490 of FIG. 13, direct-vote circuitry 507 asserts a direct-vote-winner (dvw) signal in response to determining (with respect to the error counts output from the alias disqualification circuitry, if present and enabled) that the error count reported for one and only one metadata candidate (the $i^{th}$ metadata candidate) is within the correction limit for all superdecodes (outputting a corresponding metadata index, $mdi_{dv}$). Similarly, if enabled (qve=1), qualified-vote circuitry 509 asserts a qualified-vote-winner (qvw) signal in response to determining (with respect to error counts output from the alias disqualification circuitry, if present/enabled) that the error locations reported for one and only one viable metadata candidate matches one or more pre-configured/pre-selected error location signature (elsg(s)), outputting a corresponding metadata index, $mdi_{qv}$. Logic gates 515 and 517 (which may be subsumed into output selector 511 in alternative embodiments) correspond to the operational flow determinations shown at 450, rendering a deasserted validation signal ("val") at the input of selector 511 in response to corruption-detect signal assertion, and otherwise asserting the validation signal if any of the alias-free, direct-vote-winner or qualified-vote-winner signals are asserted. Output selector 511 receives the metadata indices from the alias-detect, direct-vote and qualified-vote signals together with the validation signal and the alias-free, direct vote winner, qualified vote winner signals, selecting an output metadata value indicated by one of the metadata indices according to the hierarchy shown at 450 (e.g., according to the $mdi_{af}$ if the alias-free signal (af) is asserted, according to $mdi_{dv}$ if the alias-free signal is deasserted and dvw (direct vote winner) is asserted, and according to $mdi_{qv}$ if signals af and dvw are deasserted and qvw (qualified vote winner) is asserted) and also outputting, as the corrected cache line (cCL) the four cache line fragments corresponding to the selected metadata candidate, and outputting, as the aggregate syndrome (AgSyn), the four fragment syndromes corresponding to the four cache line fragments. If the validation signal is deasserted with respect to a given cache line decode operation, the selector circuit sets the aggregate syndrome to reflect an uncorrectable error (UE).

In alternative embodiments, the irrecoverable cache line detection shown at 455 and corresponding circuitry at 501, may be programmatically bypassed (programmed setting disabling detector 501 from asserting corruption-detect signal, cd) to enable output-select logic to output a validated metadata candidate (if ascertained by the alias-detect and/or voting circuitry) despite irrecoverability of one or more cache line fragments. Where a validated/recovered metadata value itself indicates an invalid cache line (e.g., poison bit set), the recovered metadata alone may be deemed a successful/valid memory read as the cache line content is effectively rendered "don't care" by virtue of the poison status indicated by the recovered metadata. Accordingly, the recovered metadata may be output as shown at 451 (together with a default/placeholder cache line/syndrome or aggregated cache line fragments/syndrome fragments as available from the RS decoder) rather than signaling uncorrectable error at 453—potentially avoiding unnecessary failure recovery/analysis/logging operations as the cache line itself is unneeded/unusable regardless of the RS-decoder-reported error count. In other embodiments, where metadata recovered within the first of multiple sequentially decoded sets of codewords indicates poison status (e.g., cache line invalid), RS decode operations with respect to subsequent sets of codewords may be skipped (bypassed, temporary RS-decoder disable, etc.) in whole or part to save power and potentially reduce latency (as the temporal overhead of RS decoding the subsequent sets of codewords is avoided).

Referring to FIG. 12, for example, upon recovering a poison-specifying metadata value from the A/B codewords, RS decoding may be omitted (e.g., according to programmed setting within register 447 shown in FIG. 13 or other configuration register/circuitry) with respect to the C/D codewords to save power/reduce latency—or at least skipping the unneeded candidate-metadata RS decodes to reduce power consumption and latency (avoiding the temporal overhead otherwise required to resolve a final metadata output from among multiple metadata candidates in those subsequent RS decodes).

FIG. 14 illustrates additional detail with respect to the known-aliasing disqualifier, direct voting circuitry, and qualified voting circuitry shown in FIG. 13. In the depicted embodiment, known-alias disqualifier 505 pre-conditions the syndromes produced by the four superdecodes (twenty RS syndromes total in this example, five per each of the A-D codeword superdecodes—$Syn_A[4:0]$, $Syn_B[4:0]$, $Syn_C[4:0]$, $Syn_D[4:0]$) by revising the error count for any syndrome reporting that one or more of 't' symbol errors (where t, the correction limit, is two in the RS(37, 33, 8) example shown in FIGS. 13 and 14) appears in the pattern/padding data. Thus, as shown in the example at 530, the error counts within syndromes marked by hashed shading-reporting 't' symbol errors for which one or both error locations fall within the pattern/padding data—are revised to indicate an uncorrectable number of errors (>t), effectively disqualifying those syndromes from contributing to a vote-winning tally (i.e., zero instances of uncorrectable error reports) and thus effectively disqualifying the corresponding metadata candidates from winning either a direct or qualified vote. Referring to the four syndromes for metadata candidate '111b', for example, absent disqualification of the known aliasing in the RS decode result for codeword D (i.e., $Syn_D$ reports correctable number of errors and that one or both errors occurred impossibly/implausibly in the pattern/padding data), the direct vote tally for that syndrome would be zero, rendering a three-way tied/conflicted direct vote (i.e., no direct vote winner). Operation of the known-alias disqualifier effects a nonzero tally with respect to metadata candidate '111b', eliminating that candidate from contention. Vote-tally circuitry 531 within the direct vote circuit block generates a sum of uncorrectable-error instances for each metadata candidate that are compared within compare circuit 533—seeking to identify, as a direct-vote winner, a singular candidate that yields a zero tally (no uncorrectable error instance). As two metadata candidates (001b and 011b) yield zero tallies in this example, the direct voting circuitry 507 is unable to resolve a vote winner (as would be the case where only one metadata candidate yielded a zero tally) and therefore deasserts the direct-vote-winner signal (dvw). By contrast, where the direct vote yields a singular (one and only one) zero-tally, comparator circuit 533 asserts dvw to signal detection of a direct vote winner, outputting the index of the corresponding metadata candidate ($mdi_{dv}$)—or the value of the metadata candidate itself-together with an aggregation of the four syndromes corresponding to the metadata candidate ($agSyn_{dv}$).

Still referring to FIG. 14, the qualified voting circuitry 509, when enabled by the qualified-vote-enable (qve) signal, disqualifies syndromes that fail to match one or more predetermined error location signatures (elsg(s)) from participating in a subsequent vote-revising the error count for each such syndrome to report an uncorrectable number of errors as shown in the example at 540. By this operation, qualified-vote tally circuitry 537 generates a non-winning (nonzero) tally for any otherwise viable metadata candidate for which the syndrome reports error locations other than those specified by the error location signature(s). As explained below, the error location signatures may be dynamically determined (e.g., based on evaluation of aggregate syndromes over time) by error-analysis circuitry within the memory-control IC itself and/or implemented within an off-chip error-analysis engine—in either case, programming/writing one or more error location signatures into configuration register(s) or other configuration circuitry within the host memory control IC (e.g., register 447 shown in FIG. 13).

Continuing with the FIG. 14 example, after disqualifying syndromes reporting error locations other than those specified by error location signature(s), tally circuitry 537 generates, for each candidate metadata value, a tally (count) of syndromes reporting uncorrectable numbers of errors—in this example, eliminating one of the two viable direct-vote metadata candidates (i.e., by revising the error count reported within the syndrome for candidate metadata 011b within the codeword-A superdecode) so that only one metadata candidate yields a qualified vote winner (metadata value 001b). Accordingly, comparator 539 asserts qvw to signal detection of a qualified vote winner, outputting the corresponding metadata index ($mdi_{qv}$) and aggregate syndrome ($agSyn_{qv}$).

FIG. 15 illustrates an embodiment of a memory control component 550 having, in addition to metadata recovery circuitry according to embodiments above, error-analysis circuitry 551 to collect and analyze error-location information (i.e., reported within aggregate-syndromes output from RS decoding circuitry over time), and, based on that analysis, selectively enable qualified voting within the RS decoding circuitry (i.e., by asserting a dynamic qve signal, $qve_{dy}$). In one embodiment, error-analysis circuitry 551 maintains (incrementally updates) an error-location histogram having error-count fields corresponding to respective physical memory address sub-fields—for example, error-count fields corresponding to physical memory rank, logical memory rank (e.g., where individual memory components include two or more separately selectable/addressable memory dies corresponding to respective "logical" memory ranks), bank address, row address and column address—incrementing tallies with respect to individual address sub-fields for which RS-decode syndromes report errors. Through this operation and by testing individual error tallies for over-threshold conditions, the error analysis circuitry (also referred to herein as an error-analysis engine) may selectively enable qualified voting according to whether a given memory transaction will access/employ a compromised or potentially compromised resource—a discrete/individual memory component within a physical memory rank, an individual memory chip (e.g., one of multiple memory dies stacked or otherwise disposed within a discrete memory component) within a logical memory rank; a particular bank or bank group within an individual memory chip, a particular row (or page) within a specified bank or bank group, a particular column within with a specified row or a particular column within a specified memory bank (independent of accessed row), etc.—enabling qualified voting specifically for that particular memory access and, at least under some voting policy settings/configurations, disabling qualified voting for memory accesses that do not resolve to an error-histogram-designated resource. By this operation (selectively disabling qualified voting), the full error correction capability is retained with respect to two random symbol errors that might otherwise match a systemic-error signature for that resource. As shown, a programmable register 553 (or other configuration circuit) may output an enable signal to error-analysis engine to selectively engage its operation, thus enabling the error-analysis engine to be disabled, for example, where one or more other system components (external to the memory control component) are provided to identify compromised resources—in which case, qualified voting may be directly enabled by a program setting ($qve_{pr}$) within register 553 (i.e., one or more other system components issuing instruction to program specific values/settings within register 553, including error location signatures as discussed above). Programmable register 553 may also be programmed with configuration information that specifies resource-failure (e.g., memory component, memory die, memory bank, memory row, memory column) for which qualified voting is to be enabled and one or more error-count thresholds to be exceeded for those specific resources before enabling qualified voting. While the RS encoder/decoder set is depicted within the physical signaling interface (PHY) of memory controller 550, the RS encoder/decoder circuitry may instead be implemented within the controller core (i.e., deemed to be part of the controller core instead of the physical signaling interface)—a disposition (in PHY or in core) applicable with respect to all memory controller embodiments herein.

FIG. 16 illustrates an embodiment of a memory control component 570 having error-analysis circuitry as discussed above together with selectable-symbol-size RS encoders and decoders—enabling programmed specification of Reed-Solomon symbol size (e.g., selecting between 8-bit symbol size and 16-bit symbol size in the depicted example) and thereby exchanging codeword quantity (number of candidates in direct/qualified votes) and uncorrectable-error probability. That is, in some memory subsystem implementations and/or applications, it may be desirable/beneficial to lower UE probability through increased RS symbol size, despite reduced voting efficacy (i.e., lessened probability of resolving aliased decode results through direct and/or qualified voting due to codeword count reduction), while the converse is preferable in other cases. Register 573 may be programmed to select the symbol size preferable in any given sub-system application or where runtime circumstances weigh in favor of one symbol size over another. In one embodiment, the symbol-size selection enables an appropriate one of two or more RS encoder/decoder sets (e.g., according to the number of selectable symbol sizes), disabling all others. In other embodiments, symbol-size selection may be implemented by enabling/disabling circuitry within a single RS encoder/decoder set to reduce die-area footprint. In either case, any practicable number of RS symbol-sizes may be supported (and likewise for error detection/correction schemes other than Reed-Solomon) and programmatically-selected ECC symbol sizes may be implemented in memory controllers lacking on-chip error-analysis circuitry.

In the specific example shown in FIG. 16, the RS encoder/decoder pair may be configured (according to programmed setting) to operate in either RS(37, 33, 8) format or RS(37, 33, 16) format. In the RS(37, 33, 8) configuration, corresponding to the example shown in FIG. 13, the RS encoder set generates a four-symbol (4-byte) ECC for each 33-symbol message (message content=16 symbols (bytes) of application data, 16 padding symbols and one (1) metadata symbol) and thus four 20B (20-symbol) codewords (4B ECC+16B application data) per cache line write. During cache line readback, the RS(37, 33, 8) super decoder set executes a 5-way superdecode with respect to each of four 37-symbol RS blocks, each of the 37-symbol (37-byte)

blocks including the 20-symbol codeword read back from memory together with 16 padding symbols and a metadata symbol (i.e., a respective one of five candidate metadata values per RS(37, 33, 8) decode for the subject codeword and padding within the 5-way superdecode).

When configured for 16-bit symbol size (i.e., SymSz=16), the RS encoder set (shaded in FIG. 16) generates a four-symbol (8-byte) ECC for each 33-symbol (66-byte) message (message content=16 application data symbols (32 bytes), 16 padding symbols (32 bytes) and one metadata symbol (2 bytes)) and thus two 40B (20 symbol) codewords (8B ECC+32B application data) per cache line write. During cache line readback, the RS(37, 33, 16) superdecoder set (also shaded in FIG. 16) executes a 5-way superdecode with respect to each of two 37-symbol RS blocks, each 37-symbol (74-byte) block including the 20-symbol (40-byte) codeword read back from memory together with 16 padding symbols (32 bytes) and a 2-byte metadata symbol (i.e., each metadata symbol being a respective one of five candidate metadata values per RS(37, 33, 16) decode for the subject codeword and padding within the 5-way superdecode).

Still referring to FIG. 16, where the largest permissible symbol size (i.e., largest symbol size that may be specified by setting with register 573) yields a single codeword per cache line, alternately configuring the RS encode/decode between smaller and larger symbol sizes effectively switches between storage of multiple codewords per cache line (smaller symbol size) and storage of a single codeword per cache line (largest symbol size) and thus between a configuration in which voting (two or more RS superdecodes using respective (different) codewords per superdecode but the same set of candidate metadata values in each superdecode) is enabled (smaller symbol size corresponding to 2+ codewords) and disabled (larger symbol size yielding a single codeword per cache line). For example, when deployed in combination with the memory module configuration shown at 365 in FIG. 10, memory controller 570 may configure the RS encode/decode circuitry either to (i) encode/decode two 36B codewords per cache line using byte-sized symbols within RS(37, 33, 8) encoder/decoder set (i.e., message consisting of 32 application data symbols, one metadata symbol and no padding), or (ii) a single 72B codeword per cache line using an RS(37, 33, 16) encoder/decoder set (message consisting of 32 application data symbols and thus 64 bytes of application data (full cache line) plus one metadata symbol and no padding). During cache line readback, the RS(37, 33, 8) super decoder set executes a 5-way superdecode with respect to each of two 37-symbol RS blocks, each of the 37-symbol (37-byte) blocks including the 36-byte codeword read back from memory together with a byte-sized metadata symbol (i.e., a respective one of five candidate metadata values per RS(37, 33, 8) decode for the subject codeword within the 5-way superdecode)—an arrangement in which voting may be implemented with respect to the two codeword decodes. By contrast, voting is effectively disabled in the 16-bit per symbol RS encode/decode configuration as the RS(37, 33, 16) superdecoder executes a 5-way superdecode with respect to a single 37-symbol (74-byte) RS block constituted by the 36-symbol (72-byte) codeword read back from memory—complete 64B cache line together with 8B ECC—and the 2-byte metadata symbol (i.e., each metadata symbol being a respective one of five candidate metadata values per RS(37, 33, 16) decode for the subject codeword and padding within the 5-way superdecode).

Where the different programmably selectable RS symbol sizes yield the same number of correctable symbol errors per codeword (e.g., t=2 correctable symbol errors), increasing the symbol size (and thus lowering the number of codewords per cache line) effectively reduces the total number of correctable symbols even though the corrected symbols themselves are larger—a further consideration which may motivate for programmed selection of one symbol size over another in a given application of memory controller 570. With regard to selecting between m=8-bit and m=16-bit symbol sizes within the RS(37, 33, m) encoder/decoder sets of FIG. 16, for example, programming memory controller 570 (i.e., storing a symbol-size setting within register 573) to implement an 8-bit symbol size that yields four codewords per cache line (e.g., in context of memory module 360 shown in FIG. 10) enables correction of four 8-bit symbols at four arbitrary locations within the 80B volume (64B cache line and 16B ECC) retrieved from memory (i.e., in four 20B codewords). By contrast, programming memory controller 570 to implement a 16-bit symbol size (yielding two codewords per cache line in the context of memory module 360 shown in FIG. 10) enables correction of two 16-bit symbols at two (half as many) arbitrary locations within the 64B cache line/16B ECC retrieved from memory (i.e., in two 40B codewords)—the same net quantity of corrected data, but with half the number of distinct/independent error locations.

FIG. 17 illustrates exemplary address-compare circuitry that may be deployed within the error-analysis engine discussed above in reference to FIGS. 15 and 16. In the depicted example, the address-compare circuitry includes a ternary content-addressable memory 585 (TCAM) that is loaded (during system run-time or otherwise) with resource-addresses corresponding to over-threshold error counts. For example, upon detecting an over-threshold error count/histogram-entry with respect to a given memory resource, control circuitry within the error-analysis engine discussed in reference to FIGS. 15 and 16 (and/or external fault detection circuitry) loads/programs an address corresponding to the resource into the TCAM storage array 587, effectively updating a database of addresses corresponding to compromised resources. Thereafter, memory-read addresses supplied by a command sequencer 589 (e.g., command queue within the memory control component) are applied as TCAM comparand values (591) and thus simultaneously compared with all TCAM entries (pre-loaded addresses corresponding to compromised resources) to ascertain whether a given memory read is directed to a compromised resource. More specifically, if the read-address comparand matches a given TCAM entry, a corresponding one of match lines 593 will be activated to select (via an encoded address generated by priority encoder 595 in response to one or match line activations) a corresponding one of error location signatures 597 (or two or more of those error location signatures) to be supplied to qualified voting circuitry 509 for comparison with syndrome-reported error locations. By this operation, transaction-relevant error location signatures are applied within qualified voting circuitry—for example, address-specific error-location signatures such that (i) the error location signatures will (or may) change from one memory read operation to the next, and (ii) qualified voting occurs only with respect to memory read addresses that resolve to faulting/potentially-faulting memory resources. For example, where the address for a given memory read operation matches none of the TCAM entries (no faulty/potentially-faulty resources accessed/employed in particular memory access) TCAM 585 deasserts match signal 598 (i.e., in response to the no-match search result) to disable qualified voting circuitry 509 (i.e., causing gate 599 to deassert the signal at the enable-input of qualified voting circuitry 509). Conversely, the TCAM asserts match signal 598 in response to an affirmative match to enable qualified voting (if qve is programmed to a high state or dynamically enabled, for example, by the error-analysis engine discussed above).

In the FIG. 17 embodiment, individual bits of memory addresses loaded into the TCAM (i.e., individual bits within TCAM "entries") may be masked (i.e., each TCAM cell being capable of storing a logic '1', logic '0' or don't-care and hence a ternary-state value) so that hardware faults may be recorded within individual TCAM entries with varying hierarchical precision. Accordingly, component level faults may be specified by storing (within a TCAM entry) a fault address (f-addr0) having an unmasked chip-select bit pattern with all other address fields masked as denoted by grey-shading (i.e., so that any memory read address directed to the physical memory rank containing the faulted component will yield a match with the component-level-fault entry and thus select error location signature 'a' as shown at 601). Similarly, die-level faults (e.g., all data read out of a given memory die corrupted) may be specified by storing a fault address having unmasked chip-select and chip-ID fields, with those two fields collectively specifying a logical memory rank containing a faulted memory die (and bank-address, row-address, column-address fields masked, so that a match will be detected irrespective of bank, row, column address bit patterns). Progressing further into the resource hierarchy, bank-level faults (failure of a storage bank or bank-group) may be specified by storing a fault address having unmasked chip-select, chip-ID and bank-address fields (the latter optionally including one or more masked bits to specify a bank-group selection rather than an individual memory bank within the group), and row-level faults (failure of a storage row within a given memory bank) may be specified by fault addresses having unmasked chip-select, chip-ID, bank-address fields and row address fields—that fault address being further resolved to a row/column-level fault (failure within a specified column of a storage row) by unmasking a column-address field. Where failures occur at a specific column address independently of the row address (as may happen upon failure of one or more bit-level sense amplifiers, bit lines, column decoder circuits, etc.), column-level faults may be specified by a bank-level fault address for which the column-address field is unmasked while the row-address field remains masked. More generally, any combination of address-level masking may be used to specify faulty (or suspected faulty) resources, including multiple different resources within the same memory component and/or resources spread across components of the same or different physical or logical memory ranks (e.g., two or more faulted memory banks, rows, row/columns, columns within the same or different dies, two or more faulted memory dies within the same or different memory components, etc.).

In one embodiment, encoder 595 generates an index ("match index") corresponding to an asserted match line and applies that index to select (e.g., via multiplexer 603) the corresponding error location signature for application to qualified voting circuitry 509. Each selectable error location signature be constituted by two or more error location patterns (e.g., all 10 of the error-location patterns shown in FIG. 10 where there is uncertainty as to the exact faulting IC within a logical memory rank), and encoder 595 may resolve between two or more match line assertions by encoding an index according to priority information stored with the fault address and/or according to storage location of the fault address within the TCAM array (thereby enabling the TCAM to be loaded with fault addresses in a strategic order that prioritizes some fault addresses over others).

FIG. 18 illustrates an exemplary link-fault patterns for a DIMM having a 72-bit memory channel (e.g., eighteen ×4 memory devices per physical rank) that outputs a 64B cache line and 8B ECC value (72B total) in two successive 36-byte codewords, A and B (each including a 32B CL fragment and 4B ECC value), over respective back-to-back 4-UI bursts. In the depicted embodiment, the codewords are formatted for application in an RS(37, 33, 8) encode/decode scheme in which a metadata symbol (e.g., having some finite number of metadata states such as the five metadata states in the examples above, or more where additional metadata code space is required) is combined with a 32B cache line fragment (application data) to form the 33B message supplied to the RS encoder. The RS encoder, in turn, generates a 4B ECC value that is combined with the source 32B cache line fragment to yield a 36B codeword-one of the two codewords transmitted to memory in respective, back-to-back 4-UI data bursts (8 UI total) in a memory write transaction and later received from memory (also in back-to-back 4-UI data bursts) in a memory read transaction. In the 8-bit symbol-size example shown, each 36B codeword contains 36 symbols that are conveyed via adjacent links in upper and lower 4-bit halves—upper and lower nibbles. With this codeword format, each ×4 memory component within a selected rank simultaneously outputs a respective pair of symbols over a 4-UI burst so that the complete memory rank (18 memory components) collectively outputs a 36-symbol codeword as shown at 620. Accordingly, systemic-error-provoked aliasing (i.e., presence of t=2 systemic symbol errors such that, even in absence of random symbol error, a codeword containing an incorrect metadata candidate may incorrectly be reported as containing a correctable/corrected number of errors) may occur whenever both symbols output by a given memory IC are subject to systemic error—in this example, upon occurrence of three or four link faults with respect to a given memory IC (as each of the two symbols output by the memory IC are impacted) or two link faults on alternate links. Note that if the upper and lower halves of a given symbol are output via alternate rather than adjacent links—as may be implemented in an alternative embodiment—then then two systemic symbol errors will occur upon faults in two adjacent links, but not two alternate links. In either case (symbol split across adjacent links or alternate links), as in the 4×20B codeword example in FIG. 12, instances of two systemic errors localized to a single memory component are characterized by a consecutive-symbol error-location signature. That is, a valid RS decode in the presence of a single-component failure that yields two systemic-symbol errors (and absent random symbol errors) will report errors in consecutive symbols (0/1, 2/3, 4/5, . . . 34/35) and thus may be distinguished from aliasing RS decodes that report symbol errors in non-consecutive symbols.

By implementing an RS encoder/superdecoder set that accommodates both the 20B codewords conveyed via the 40-bit memory channel shown in FIG. 12 and the 36B codewords conveyed via the 72-bit memory channel shown in FIG. 18—with sufficient message/block size headroom to include at least one metadata symbol (e.g., RS(37, 33, 8) or RS(37, 33, 16))—the same encoder/superdecoder hardware set can be programmatically configured for operation with either DIMM type. Also, by formatting the 20B and 36B codeword to have similar systemic-error signatures (e.g., symbol errors in consecutive codeword symbols), minimal changes, if any, are required for application of the qualified voting circuitry discussed above with either DIMM type.

FIG. 19 illustrates an embodiment of a voter/selector circuit 640 similar to that shown in FIG. 13 but having additional circuitry to support programmably selected codeword size and quantity-operable with respect to either the 4×20B codewords shown in FIG. 12 or the 2×36B codewords shown in FIG. 18 (the support for programmably selected codeword size/quantity may readily be extended to other codeword formats, sizes and quantities). When configured for operation with respect to the 4×20B codewords discussed above—a setting specified by a codeword-format ("cwf") field within programmable register 641—superdecoders 643$_0$ and 643$_1$ and voter/selector 640 operate generally as discussed in reference to FIG. 13 to implement the operational flow shown at 645. When configured for operation with respect to the 2×36B codewords shown in FIG. 18, superdecoder 643$_1$ is disabled (as the controller IC receives only one codeword at a time—A, then B) with the data input to that superdecoder multiplexed to the message input of superdecoder 643$_0$ in place of padding data. More specifically, though not shown in detail in FIG. 19, multiplexing circuitry disposed between the memory-controller data interface and the constituent RS decoders of superdecoders 643$_0$/643$_1$ delivers data for RS decoding as follows according to the programmed codeword format (cwf)—various additional block sizes, codeword formats, symbol sizes, decode cycle times, etc. may be supported in alternative embodiments:

| RS Dec Cycle | CW Format | CW Size | Padding Data | Metadata (value/dec) | SupDec$_0$ Input | SupDec$_1$ Input | Dec Cycle Time |
|---|---|---|---|---|---|---|---|
| | | RS Block Input (37B total) | | | | | Dec |
| 0 | 4 × 20B | 20B | 16B | 1B | CW A | CW B | 8UI |
| 1 | 4 × 20B | 20B | 16B | 1B | CW C | CW D | 8UI |
| 0 | 2 × 36B | 36B | none | 1B | CW A | unused | 4UI |
| 1 | 2 × 36B | 36B | none | 1B | CW B | unused | 4UI |

Referring to FIG. 19 detail view 647, component circuitry within voter/selector 640 (which otherwise operates generally as discussed above) responds to specification of the 2×36B codeword (i.e., specification conveyed via codeword format specifier, cwf) by ignoring the syndrome outputs from superdecoder 643$_1$ (e.g., disabling operation of syndrome buffer 497 and circuitry that otherwise operates with respect to those syndromes within irrecoverable-cache-line detector 501, alias detector 503, known-alias disqualifier 505, direct vote block 507, qualified vote block 509 and output selector 511). As there is no padding data in the 2×36B codeword format (i.e., not counting any padding bits that may form part of the metadata symbol), known-alias disqualifier 505 may be bypassed (or disabled) altogether. Also, because the 4×20B and 2×36B codeword formats incorporate different cache line fragment sizes and quantities, alternately selectable (according to cwf setting) cache-line multiplexing circuits may be provided within select output circuitry 511 to select and aggregate cache line fragments corresponding to the finalized metadata determination-likewise for syndrome aggregation (as the number of syndromes to be aggregated varies according to cwf setting).

FIG. 20 illustrates a RS decode engine 661 that supports programmable specification of a variable number of metadata states and/or poison bit inclusion-control fields bearing on the total number of candidate metadata values to be applied in respective RS decode operations and thus the total number of RS decode operations per superdecode. In the depicted example, programmable register 663 is expanded (relative to counterparts discussed above) to include (i) a valid-meta-data-state field ("vmds") that specifies/indicates the number of valid, non-poison metadata states within a given memory control application, and (ii) a poison-bit field that indicates whether the state-specifying metadata bits are to be supplemented by an additional poison bit, supplying both of those control values to a superdecode control circuit 665 which, in turn, outputs decode-enable signals (e0-e4) and candidate metadata values ($cMD_0$-$CMD_4$) to respective RS decoder components of each of two or more super decoders (e.g., $667_0$, $667_1$). In the FIG. 20 embodiment, control circuit 665 includes combinatorial logic circuitry to generate the decode-enable and candidate metadata values as shown in table 669. Thus, when the valid-metadata-state field indicates four valid metadata states and the poison-bit field indicates that a poison bit is to be included, controller 665 asserts all five decode-enable signals (e0-e4) to enable operation of all five component RS decoders (Dec0-Dec4) within each of superdecoders $667_0$ and $667_1$ (there may be more or fewer than two superdecoders in alternative embodiments) and likewise outputs five distinct metadata values to be applied within each respective set of five enabled RS decoders (i.e., respective set of enabled RS decoders within each superdecoder). When the poison-bit field indicates that no poison bit is present, the total number of valid metadata states is reduced by one (i.e., to the four metadata values shown in the second row of table 669) so that only four RS decode operations are needed within each superdecoder. Accordingly, one of the five decode-enable signals is deasserted—e4 in the depicted example—to disable operation of the corresponding component RS decode circuitry (within each superdecoder), while the other four decode-enable signals remain asserted to enable decode operations with respect to the four candidate metadata values. When the number of valid metadata states is reduced to two (and thus subject to representation by a single metadata bit), the number of enabled RS decoders is reduced commensurately—enabling either three or two RS decode operations according to whether the poison-bit is or is not to be included, respectively (see final two rows of table 669). In other embodiments, superdecode controller 665 may disable all but one RS decoder (e.g., asserting e0 while deasserting e1-4) where no metadata is to be recovered and may output separate sets of enable signals to the different superdecoders (e.g., enabling one or more superdecoders to be disabled entirely when not needed for a given codeword format). In all cases, padding bits (including dynamically generated padding bits as discussed above) may be included as necessary to round out the metadata symbol (e.g., 5 padding bits+3 bit metadata value to form 8-bit metadata symbol; 13 padding bits+3 bit metadata value to form 16-bit metadata symbol, etc.). Also, while a one-to-one correspondence between candidate metadata values and component RS decoders is shown in FIG. 20 (e.g., $cMD_0$ conveyed to component RS decoder "Dec0"), the SD controller may include circuitry to selectively route a given candidate metadata value to any of the component decoders in alternative embodiments, including routing different candidate metadata values to respective component decoders in accordance with a setting with programmable register 663 or other configuration circuitry. More generally, any number of superdecoders 667 may be implemented within RS decode engine 661, with any number of component RS decoders per superdecoder and any practicable number of valid metadata states and supplementary bits (poison bit being but one example) with table 669 extended accordingly to selectively enable component RS decoders within each superdecoder (including disabling one or more superdecoders entirely while one or more other superdecoders are enabled in whole or part) and/or route candidate metadata values to those superdecoders. Also, though not specifically shown in FIG. 20, the pattern data input ("P-Dat") may convey either application data or pattern data (dynamically generated or fixed as discussed above) according to application requirements with, for example, application data content (e.g., codeword or fragment thereof) multiplexed onto the pattern data input (and thus supplied to all component RS decoders) within one or more of superdecoders 667 in accordance with programmed configuration (e.g., as described in reference to FIG. 19).

Referring to FIGS. 1-20 generally, any and all memory controllers presented herein may be implemented within a standalone integrated circuit component or packages or within one or more IC components (including packages having multiple IC dies) that combines the memory control function with one or more other functions (e.g., integrated-circuit processor, application-specific integrated circuit (ASIC), etc.). Also, one or more programmed microcontrollers and/or dedicated hardware circuits (e.g., finite state machines, registered or combinational circuits, etc.) may implement and/or control all or part of the various architectural and functional elements within the memory controller architectures presented herein (e.g., to implement any one or more of the ECC decoders, encoders, pattern data generators, syndrome comparator, vote/select circuitry, etc.). Additionally, any or all of those architectural/functional elements (including the entirety of an over-capacity/virtual-metadata-storage memory controller architecture according to embodiments herein) may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details not required to practice those embodiments. For example, the various memory device widths, per-DIMM device counts, signaling path widths, data block sizes, data block fragment sizes, cache line sizes, meta data bit depths, number of valid meta data states, number of encode/decode iterations, message lengths, encoding/decoding schemes and parameters, host interface types, data-unit or symbol sizes (e.g., nibbles, bytes), metadata sizes, error detection/correction capabilities, codeword formats (and quantities per memory read/write transaction), encoder/decoder type (and block size, message size, symbol size), counter bit-depths, counter architectures, and so forth are provided for purposes of example only-any practicable alternatives may be implemented in all cases. Similarly, signaling link parameters, protocols, configurations may be implemented in accordance with any practicable open or proprietary standard and any version of such standard. Links or other interconnection between integrated circuit devices or internal circuit elements or blocks may be shown as buses or as single signal lines. Each of the buses can alternatively be a single signal line (e.g., with digital or analog signals time-multiplexed thereon), and each of the single signal lines can alternatively be a bus. Signals and signaling links, however shown or described, can be single-ended or differential. Logic signals shown as having active-high assertion or "true" states, may have opposite assertion states in alternative implementations. A signal driving circuit is said to "output" a signal to a signal receiving circuit when the signal driving circuit asserts (or deasserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device or register "programming" can include, for example and without limitation, loading a control value into a configuration register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operational aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. An integrated circuit component comprising:
data receive circuitry to receive a first block of data and corresponding error correction code from one or more external memory components in a memory read operation;
decoding circuitry to execute error detection/correction operations with respect to a plurality of input data volumes to generate a corresponding plurality of error syndrome values, the input data volumes each including the first block of data and corresponding error correction code together with a respective, different one of a plurality of q-bit data patterns such that each of the input data volumes is identical to the others of the input data volumes except for the respective different one of the plurality of q-bit data patterns, where q is a nonzero integer;
qualification circuitry to generate error qualification information by comparing error location information within the plurality of syndrome values with predetermined error location information; and
output circuitry to select one of the plurality of q-bit data patterns to be an output q-bit value based on the error syndrome values and the error qualification information.

2. The integrated circuit component of claim 1 further comprising a programmable register to store a qualify-enable value, and wherein the output circuitry to select one of the plurality of q-bit data patterns to be the output q-bit value based on the error syndrome values and the error qualification information comprises circuitry to select one of the plurality of q-bit data patterns to be the output q-bit value based on the error syndrome values and the error qualification information if the qualify-enable value is in a first state and to select one of the plurality of q-bit data patterns to be the output q-bit value without regard to the error qualification information if the qualify-enable value is in a second state.

3. The integrated circuit component of claim 1 wherein the qualification circuitry to generate error qualification information by comparing error location information within the plurality of syndrome values with predetermined error location information comprises circuitry to generate the error qualification information according to whether error location information within the plurality of syndrome values matches one or more error locations specified within the predetermined error location information.

4. The integrated circuit component of claim 1 wherein the decoding circuitry to generate the plurality of error syndromes comprises circuitry to generate, as each of the syndromes, a value that identifies locations of any corrupted symbols within the corresponding input data volume up to a maximum number, t, of corrupted symbols, and wherein the qualification circuitry to generate error qualification information comprises circuitry to compare corrupted-symbol locations identified within the syndromes with predetermined corrupted-symbol locations.

5. The integrated circuit component of claim 4 further comprising configuration circuitry to store information that specifies the predetermined corrupted-symbol locations.

6. The integrated circuit component of claim 4 further comprising circuitry to generate information that indicates the predetermined corrupted-symbol locations.

7. The integrated circuit component of claim 4 wherein the output circuitry to select one of the plurality of q-bit data patterns to be the output q-bit value based on the error syndrome values and the error qualification information comprises circuitry to select, as between two or more of the plurality of q-bit data patterns for which corresponding syndromes indicate matching quantities, t, of corrupted symbols, one of the plurality of q-bit patterns for which the syndrome indicates locations of the t corrupted symbols that match the predetermined corrupted-symbol locations.

8. The integrated circuit component of claim 4 wherein the output circuitry to select one of the plurality of q-bit data patterns to be the output q-bit value based on the error syndrome values and the error qualification information comprises circuitry to disqualify, from being the output q-bit value, all but one of any two or more of the plurality q-bit data patterns for which corresponding syndromes indicate matching quantities, t, of corrupted symbols.

9. The integrated circuit component of claim 8 wherein the circuitry to disqualify, from being the output q-bit value, all but one of any two or more of the plurality q-bit data patterns for which corresponding syndromes indicate matching quantities, t, of corrupted symbols comprises circuitry to disqualify, from being the output q-bit value, one of the plurality of q-bit data patterns for which the corresponding syndrome indicates locations of the t corrupted symbols that do not match the predetermined corrupted-symbol locations.

10. The integrated circuit component of claim 1 wherein each of the input data volumes additionally includes one or more padding symbols, and wherein the qualification circuitry further comprises circuitry to determine whether any of the plurality of syndromes indicate a corrupted symbol at a padding-symbol location the within the corresponding input data volume.

11. A method of operation with an integrated circuit component, the method comprising:

receiving a first block of data and corresponding error correction code from one or more external memory components in a memory read operation;

executing error detection/correction operations with respect to a plurality of input data volumes to generate a corresponding plurality of error syndrome values, the input data volumes each including the first block of data and corresponding error correction code together with a respective, different one of a plurality of q-bit data patterns such that each of the input data volumes is identical to the others of the input data volumes except for the respective different one of the plurality of q-bit data patterns, where q is a nonzero integer;

generating error qualification information by comparing error location information within the plurality of syndrome values with predetermined error location information; and selecting one of the plurality of q-bit data patterns to be an output q-bit value based on the error syndrome values and the error qualification information.

12. The method of claim 11 further comprising storing a qualify-enable value within a programmable register of the integrated circuit component, and wherein selecting one of the plurality of q-bit data patterns to be the output q-bit value based on the error syndrome values and the error qualification information comprises selecting one of the plurality of q-bit data patterns to be the output q-bit value based on the error syndrome values and the error qualification information if the qualify-enable value is in a first state and selecting one of the plurality of q-bit data patterns to be the output q-bit value without regard to the error qualification information if the qualify-enable value is in a second state.

13. The method of claim 11 wherein generating error qualification information by comparing error location information within the plurality of syndrome values with predetermined error location information comprises generating the error qualification information according to whether error location information within the plurality of syndrome values matches one or more error locations specified within the predetermined error location information.

14. The method of claim 11 wherein generating the plurality of error syndromes comprises generating, as each of the syndromes, a value that identifies locations of any corrupted symbols within the corresponding input data volume up to a maximum number, t, of corrupted symbols, and wherein generating error qualification information comprises comparing corrupted-symbol locations identified within the syndromes with predetermined corrupted-symbol locations.

15. The method of claim 14 further comprising storing, within the integrated circuit component, information that specifies the predetermined corrupted-symbol locations.

16. The method of claim 14 further comprising generating information that indicates the predetermined corrupted-symbol locations.

17. The method of claim 14 wherein selecting one of the plurality of q-bit data patterns to be the output q-bit value based on the error syndrome values and the error qualification information comprises circuitry to select, as between two or more of the plurality of q-bit data patterns for which corresponding syndromes indicate matching quantities, t, of corrupted symbols, one of the plurality of q-bit patterns for which the syndrome indicates locations of the t corrupted symbols that match the predetermined corrupted-symbol locations.

18. The method of claim 14 wherein selecting one of the plurality of q-bit data patterns to be the output q-bit value based on the error syndrome values and the error qualification information comprises disqualifying, from being the output q-bit value, all but one of any two or more of the plurality q-bit data patterns for which corresponding syndromes indicate matching quantities, t, of corrupted symbols.

19. The method of claim 18 wherein disqualifying, from being the output q-bit value, all but one of any two or more of the plurality q-bit data patterns for which corresponding syndromes indicate matching quantities, t, of corrupted symbols comprises disqualifying, from being the output q-bit value, one of the plurality of q-bit data patterns for which the corresponding syndrome indicates locations of the t corrupted symbols that do not match the predetermined corrupted-symbol locations.

20. The method of claim 11 wherein each of the input data volumes additionally includes one or more padding symbols, the method further comprising determining whether any of the plurality of syndromes indicate a corrupted symbol at a padding-symbol location the within the corresponding input data volume.

21. An integrated circuit component comprising:

means for receiving a first block of data and corresponding error correction code from one or more external memory components in a memory read operation;

means for executing error detection/correction operations with respect to a plurality of input data volumes to generate a corresponding plurality of error syndrome values, the input data volumes each including the first block of data and corresponding error correction code together with a respective, different one of a plurality of q-bit data patterns such that each of the input data volumes is identical to the others of the input data volumes except for the respective different one of the plurality of q-bit data patterns, where q is a nonzero integer, means for generating error qualification information by comparing error location information within the plurality of syndrome values with predetermined error location information; and means for selecting one of the plurality of q-bit data patterns to be an output q-bit value based on the error syndrome values and the error qualification information.

\* \* \* \* \*